(12) United States Patent
Murao et al.

(10) Patent No.: US 9,497,444 B2
(45) Date of Patent: Nov. 15, 2016

(54) STEREOSCOPIC DISPLAY DEVICE

(71) Applicant: Sharp Kabushiki Kaisha, Osaka (JP)

(72) Inventors: Takehiro Murao, Osaka (JP); Hiroshi Fukushima, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 126 days.

(21) Appl. No.: 14/430,133

(22) PCT Filed: Sep. 27, 2013

(86) PCT No.: PCT/JP2013/076229
§ 371 (c)(1),
(2) Date: Mar. 20, 2015

(87) PCT Pub. No.: WO2014/054520
PCT Pub. Date: Apr. 10, 2014

(65) Prior Publication Data
US 2015/0249818 A1    Sep. 3, 2015

(30) Foreign Application Priority Data

Oct. 3, 2012   (JP) .................................. 2012-221068

(51) Int. Cl.
*G02B 27/22* (2006.01)
*H04N 13/04* (2006.01)
(Continued)

(52) U.S. Cl.
CPC ...... *H04N 13/0404* (2013.01); *G02B 27/0093* (2013.01); *G02B 27/2214* (2013.01);
(Continued)

(58) Field of Classification Search
CPC ............ H04N 13/0404; H04N 13/0468; G02B 27/2214; G02B 27/0093; G03B 35/24;
(Continued)

(56) References Cited

U.S. PATENT DOCUMENTS 6,970,290 B1 * 11/2005 Mashitani .......... H04N 13/0409
  348/54
8,363,100 B2 * 1/2013 Lu ...................... G02B 27/2264
  348/117
(Continued)

FOREIGN PATENT DOCUMENTS

JP     2011-81269 A    4/2011
JP     2012-22155 A    2/2012
(Continued)

*Primary Examiner* — Lun-Yi Lao
*Assistant Examiner* — Kelly B Hegarty
(74) *Attorney, Agent, or Firm* — Chen Yoshimura LLP

(57) ABSTRACT

Provided is a stereoscopic display device capable of achieving good stereoscopic images with a low level of crosstalk in a wide area. A stereoscopic display device includes: a display panel; a switching liquid crystal panel arranged to overlap the display panel; a control section that controls the display panel and the switching liquid crystal panel; and a position sensor that obtains position information about a viewer and supplies the same to the control section. The display panel includes first pixel lines and second pixel lines that are arranged alternately in a vertical direction. The control section switches between a plurality of display modes including a tracking three-dimensional display mode. In the tracking three-dimensional display mode, the control section causes either the first pixel lines or the second pixel lines to display pixel data constituting an image for the right eye and pixel data constituting an image for the left eye alternately in a horizontal direction, in accordance with the position information.

12 Claims, 14 Drawing Sheets

(51) Int. Cl.
  *G02B 27/00*   (2006.01)
  *G03B 35/24*   (2006.01)
  *G09G 3/36*    (2006.01)
  *G09G 3/00*    (2006.01)

(52) U.S. Cl.
  CPC ............... *G03B 35/24* (2013.01); *G09G 3/003* (2013.01); *G09G 3/3611* (2013.01); *H04N 13/0468* (2013.01); *G09G 2300/023* (2013.01); *G09G 2300/0404* (2013.01); *G09G 2320/0209* (2013.01); *G09G 2320/068* (2013.01)

(58) Field of Classification Search
  CPC .................. G09G 3/3611; G09G 3/003; G09G 2300/0404; G09G 2300/023; G09G 2320/0209; G09G 2320/068
  See application file for complete search history.

(56) References Cited

U.S. PATENT DOCUMENTS

| | | | | |
|---|---|---|---|---|
| 9,229,241 B2* | 1/2016 | Woo | ................... | G02B 27/2214 |
| 9,332,249 B2* | 5/2016 | Kim | ................... | H04N 13/0404 |
| 2012/0026396 A1* | 2/2012 | Banavara | ............ | H04N 13/045 |
| | | | | 348/500 |
| 2012/0105753 A1 | 5/2012 | Sakamoto et al. | | |
| 2012/0206446 A1 | 8/2012 | Yamazaki et al. | | |
| 2013/0027909 A1* | 1/2013 | Kim | ................... | G02F 1/133603 |
| | | | | 362/97.2 |
| 2013/0127839 A1* | 5/2013 | Ki | ........................ | G09G 3/003 |
| | | | | 345/419 |
| 2013/0135452 A1* | 5/2013 | Kasano | ............... | G02F 1/13306 |
| | | | | 348/54 |
| 2013/0169704 A1* | 7/2013 | Tanaka | ................. | G09G 3/3406 |
| | | | | 345/691 |
| 2013/0222234 A1* | 8/2013 | Tanaka | .................... | G09G 5/10 |
| | | | | 345/156 |
| 2014/0152926 A1* | 6/2014 | Takahashi | .......... | G02B 27/2214 |
| | | | | 349/15 |
| 2014/0247211 A1* | 9/2014 | Hayashi | ............. | G02B 27/2214 |
| | | | | 345/156 |
| 2015/0237334 A1* | 8/2015 | Murao | ............... | H04N 13/0468 |
| | | | | 348/59 |
| 2015/0277130 A1* | 10/2015 | Yoshino | ............. | G02B 27/2214 |
| | | | | 348/51 |
| 2016/0195731 A1* | 7/2016 | Murao | ............... | H04N 13/0409 |
| | | | | 349/15 |

FOREIGN PATENT DOCUMENTS

| | | |
|---|---|---|
| JP | 2012-98394 A | 5/2012 |
| JP | 2012-185487 A | 9/2012 |

\* cited by examiner

FIG. 8
Transmission Axis of Polarizing Plate 
Rubbing Direction 
Rubbing Direction 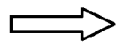
Transmission Axis of Polarizing Plate 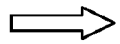
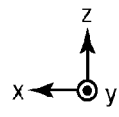
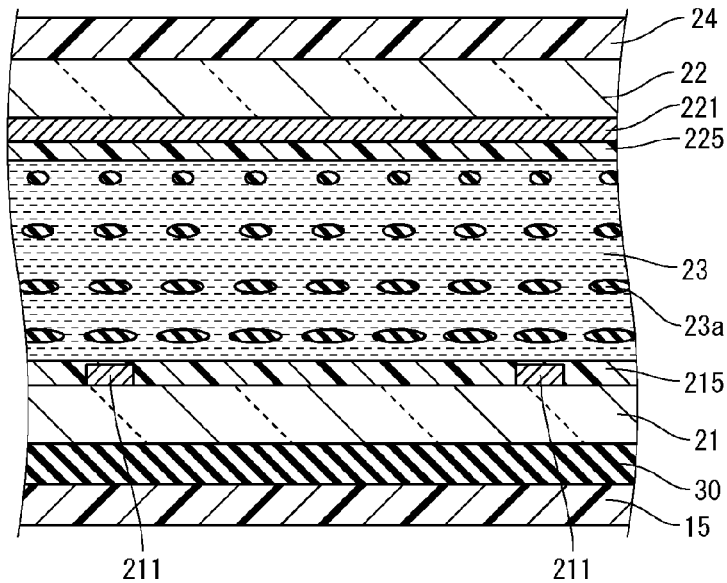
FIG. 9
Transmission Axis of Polarizing Plate 
Rubbing Direction 
Rubbing Direction 
Transmission Axis of Polarizing Plate 
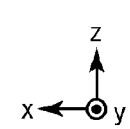
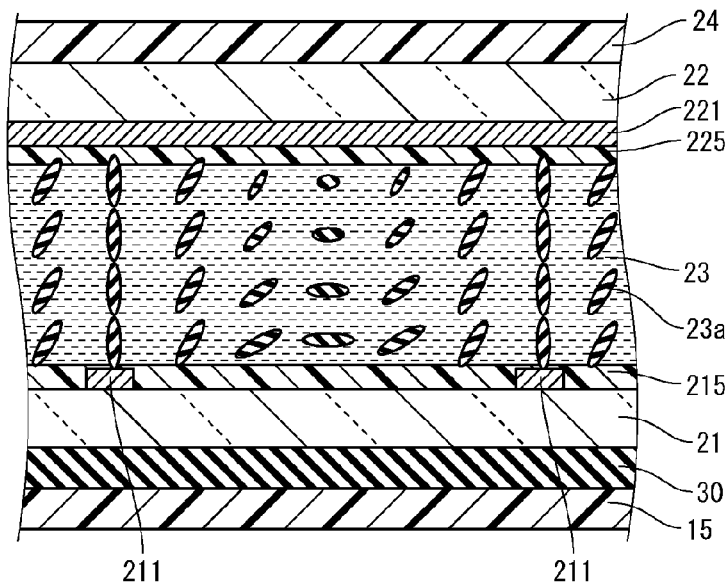

FIG. 10
|  | U Lines | B Lines | Switching liquid crystal panel | Remarks |
|---|---|---|---|---|
| Two-dimensional display | On | On | Off | Switching liquid crystal panel is off. |
| Three-dimensional display | On | Off | On | Either U Lines or B Lines are turned on. |
| Tracking three-dimensional display | Either U Lines or B Lines are turned on in accordance with the view position. | | On | Switched in real time. |
FIG. 11
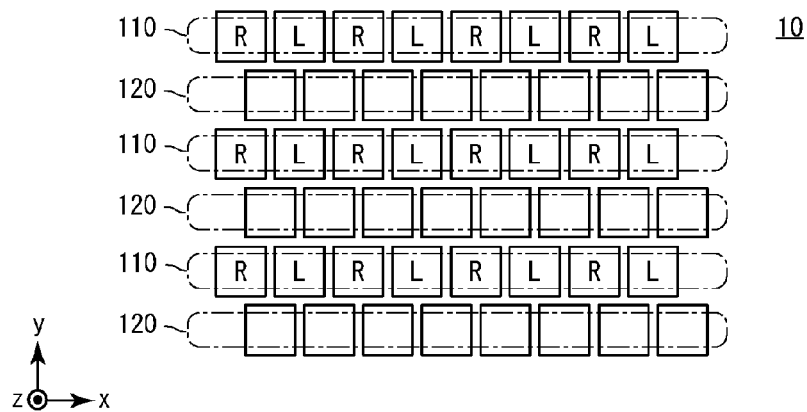
FIG. 12
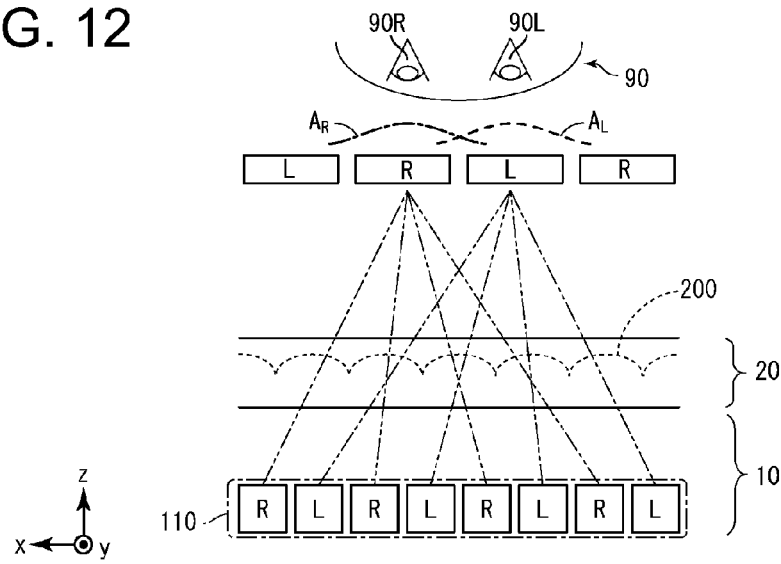

| | Method of switching views during tracking | Tracking ability | Quality in 2D | Resolution in 2D | Luminance in 2D | Resolution in 3D | Luminance in 3D | 3D quality (XT) | XT area |
|---|---|---|---|---|---|---|---|---|---|
| N-view (fixed lens) | None | Good | Good | 1/N | 100% | 1/N | 100% | Poor | No |
| N-view (SW-LCD) | Switching display images | Good | Good | 1 | 100% | 1/N | 100/N% | Good | No |
| N-view (fixed barrier) | Switching display images | Good | Good | 1/N | 100/N% | 1/N | 100/N% | Good | No |
| Left and right image SWAP (SW-LCD) | Switching display images | Good | Good | 1 | 100% | 1/2 | ~50% | Good | Yes |
| Left and right image SWAP (fixed lens) | Switching display images | Good | Poor | 1/2 | 100% | 1/2 | 100% | Good | Yes |
| Barrier partition (SW-LCD) | Switching barrier lighting positions/ Switching display images | Some-what poor | Good | 1 | 100% | 1/2 | ~50% | Good | No |
| Present embodiment (liquid crystal lens) | Switching display images | Good | Good | 1 | 100% | 1/4 | 50% | Good | No |

|  | U Lines | B Lines | Switching liquid crystal panel | | | | Remarks |
|---|---|---|---|---|---|---|---|
|  |  |  | 71A | 72A | 71B | 72B |  |
| Two-dimensional display | On | On | Off | Off | Off | Off | Switching liquid crystal panel Off |
| Three-dimensional display | On | On | On | Off | Off | Off |  |
| Tracking three-dimensional display | Either U Lines or B Lines are turned on in accordance with the view position. | | Off | On | Off | Off | Switched in real time |

FIG. 25

|  | 71A | 72A | 71B | 72B |
|---|---|---|---|---|
| Two-dimensional display | GND | GND | GND | GND |
| Three-dimensional display | +/− | GND | GND | GND |
| Tracking three-dimensional display | GND | +/− | GND | GND |

FIG. 26

|  | 71A | 72A | 71B | 72B |
|---|---|---|---|---|
| Two-dimensional display | In phase (GND is also acceptable) | In phase (GND is also acceptable) | In phase (GND is also acceptable) | In phase (GND is also acceptable) |
| Three-dimensional display | Antiphase | In phase | In phase | In phase |
| Tracking three-dimensional display | In phase | Antiphase | In phase | In phase |

FIG. 27

|  | Embodiment 1 | | Embodiment 2 | | Embodiment 3 | |
|---|---|---|---|---|---|---|
|  | Luminance | Resolution | Luminance | Resolution | Luminance | Resolution |
| Two-dimensional display | 100% | 100% | 100% | 100% | 100% | 100% |
| Three-dimensional display | ∼50% | 25% | ∼50% | 25% | ∼100% | 50% |
| Tracking three-dimensional display | ∼50% | 25% | ∼50% | 25% | ∼50% | 25% |

STEREOSCOPIC DISPLAY DEVICE

TECHNICAL FIELD

The present invention relates to an autostereoscopic display device.

BACKGROUND ART

Stereoscopic display devices that can be viewed with the naked eye fall roughly into the categories of parallax barrier systems and lenticular lens systems. These stereoscopic display devices divide light using a barrier or a lens and project different images into the left eye and the right eye to provide a three-dimensional appearance to a viewer. Two-view parallax barrier systems and lenticular lens systems are the mainstream autostereoscopic display devices available in the market in recent years.

Such two-view stereoscopic display devices provide good stereoscopic display in set areas. However, when a viewer moves the head, a phenomenon called crosstalk, double vision caused by a mixing of an image targeting the right eye and an image targeting the left eye, and so-called pseudo-stereoscopy, in which an image targeting the right eye is projected into the left eye, occur in some regions. For this reason, the viewer can view stereoscopic images only from a limited region. To solve this problem, technologies such as a multi-view technology and a tracking technology, which detects the position of the viewer and displays an image according to that position, have been proposed. However, there is no stereoscopic display device that is capable of providing stereoscopic images from a broad range of angles while maintaining two-view stereoscopic display.

Meanwhile, a liquid crystal lens system that combines the features of both the parallax barrier system and the lenticular lens system has been proposed. This system is capable of switching between a 2D display and a 3D display while maintaining the same level of luminance in the 3D display as in the 2D display. However, with this system, too, stereoscopic display is viewable only from a limited region.

A stereoscopic image display device described in Japanese Patent Application Laid-Open Publication No. 2012-98394 is equipped with a display unit and a liquid crystal lens array element (liquid crystal lens). The liquid crystal lens array element has a first electrode, a plurality of second electrodes, and a liquid crystal layer. The plurality of second electrodes are disposed to face the first electrode, and driving voltages in waveform with phase differences are applied. The liquid crystal layer is interposed between the first electrode and the plurality of second electrodes. A lens effect is produced by the potential differences between the driving voltage applied to the first electrode and the driving voltages applied to the plurality of second electrodes.

SUMMARY OF THE INVENTION

Here, the feasibility of driving a liquid crystal lens such as the one described in Japanese Patent Application Laid-Open Publication No. 2012-98394 in real time is considered. For example, if it is possible to track the position of the eyes of the viewer and change the position of the lens accordingly, crosstalk can be reduced in a wide range of angles and the viewer can view stereoscopic display in a wide region. However, this is difficult to achieve for the reasons described below.

In order to provide a lens effect to a liquid crystal layer by a refractive index distribution, it is necessary to increase the retardation of the liquid crystal layer. The retardation of a liquid crystal layer is the product of the thickness d of the liquid crystal layer and the refractive index anisotropy Δn of the liquid crystal molecules. Since the range of the refractive index anisotropy Δn is limited and can only be increased to a certain level, it is necessary to increase the thickness d of the liquid crystal layer in order to improve the lens effect.

The response time $\tau_{on}$ of changing liquid crystal of a liquid crystal lens from an off state (no voltage applied) to an on state (voltage applied) is given by the following equation. Here, γ represents the viscosity of liquid crystal, $\varepsilon_0$ represents the permittivity of free space, $\varepsilon_a$ represents the dielectric anisotropy of liquid crystal, V represents the driving voltage of liquid crystal, and $V_c$ represents the threshold voltage of liquid crystal.

$$\tau_{on} = \frac{\gamma \cdot d^2}{\varepsilon_0 \varepsilon_a (V^2 - V_c^2)} \qquad \text{<Equation 1>}$$

The response time $\tau_{off}$ of changing liquid crystal of a liquid crystal lens from the on state to the off state is given by the following equation. Here, K represents the elastic constant.

$$\tau_{off} = \frac{\gamma \cdot d^2}{\pi^2 K} \qquad \text{<Equation 2>}$$

Thus, the response time of liquid crystal is proportional to the square of the thickness d. In other words, the larger the thickness d, the slower the response time of liquid crystal. For this reason, it is difficult to achieve a sufficient lens effect to reduce crosstalk while allowing the position of the liquid crystal lens to track the movement of the head of the viewer in real time.

The present invention aims to provide a stereoscopic display device that is switchable between a 2D display and a 3D display while achieving stereoscopic images with low crosstalk across a wide region.

A stereoscopic display device described herein is equipped with: a display panel that displays image data; a switching liquid crystal panel superimposed on said display panel to receive the image data displayed on said display panel and form a right-eye image and a left-eye image that are separated in a horizontal direction adjacent to an observer; a control unit that controls said display panel and said switching liquid crystal panel; and a position sensor that acquires positional information of the observer and supplies said positional information to said control unit, wherein said display panel includes a first set of pixel rows and a second set of pixel rows arranged alternately in a vertical direction, wherein said control unit switches among a plurality of display modes including a tracking three-dimensional display mode, wherein, in said tracking three-dimensional display mode, said control unit causes the switching liquid crystal panel to separate the image data displayed on said display panel to form the right-eye image and the left-eye image that are separated in the horizontal direction adjacent to the observer, wherein, in said tracking three-dimensional display mode, a position of said right-eye image originating from said first set of pixel rows and formed by said switching liquid crystal panel differs in the horizontal direction from a position of said right-eye image originating from said second set of pixel rows and formed by said switching liquid crystal panel, wherein, in said tracking three-dimensional display mode, a position of said left-eye image originating from said first set of pixel rows and formed by said switching liquid crystal panel differs in the horizontal direction from a position of said left-eye image originating from said second set of pixel rows and formed by said switching liquid crystal panel, and wherein, in said tracking three-dimensional display mode, the control unit selects either said first set of pixel rows or said second set of pixel rows for display in accordance with said positional information of the observer, and causes pixel data that forms said right-eye image and pixel data that forms said left-eye image to be alternately displayed in the horizontal direction in the selected first or second set of pixels rows so that the observer can continue to see a stereoscopic image even when the observer moves relative to the stereoscopic display device.

According to the present invention, it is possible to provide a stereoscopic display device capable of achieving stereoscopic images with low crosstalk across a wide region.

BRIEF DESCRIPTION OF THE DRAWINGS

FIG. 8 is a schematic cross-sectional view showing a configuration of a switching liquid crystal panel in a TN orientation (off state).

FIG. 9 is a schematic cross-sectional view showing a configuration of a switching liquid crystal panel in a TN orientation (on state).

FIG. 10 is a table summarizing operations of a stereoscopic display device in each display mode.

FIG. 11 is a plan view schematically showing a manner in which a display panel realizes display in a three-dimensional display mode.

FIG. 12 is a diagram schematically showing light emitted by a display panel.

FIG. 21 is a table showing properties of a stereoscopic display device according to embodiments of the present invention in comparison to other types of stereoscopic display devices.

FIG. 24 is a table summarizing operations of a stereoscopic display device according to Embodiment 3 of the present invention in each display mode.

FIG. 25 is a table summarizing potentials applied to each electrode when liquid crystal is driven by a square wave AC voltage and a ground potential.

FIG. 26 is a table summarizing the potentials applied to each electrode when liquid crystal is driven by phase differences between in-phase and antiphase square wave AC voltages.

FIG. 27 is a table summarizing effects of each embodiment.

DETAILED DESCRIPTION OF EMBODIMENTS

Figure 1:
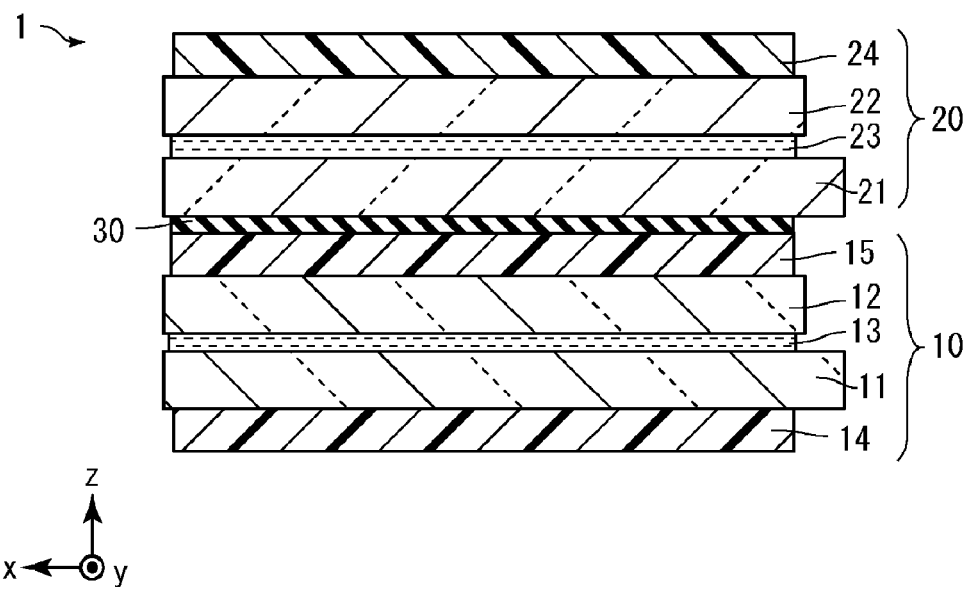
FIG. 1 is a schematic cross-sectional view showing a configuration of a stereoscopic display panel according to Embodiment 1 of the present invention.

A stereoscopic display device according to one embodiment of the present invention includes: a display panel that displays image data; a switching liquid crystal panel superimposed on said display panel to receive the image data displayed on said display panel and form a right-eye image and a left-eye image that are separated in a horizontal direction adjacent to an observer; a control unit that controls said display panel and said switching liquid crystal panel; and a position sensor that acquires positional information of the observer and supplies said positional information to said control unit, wherein said display panel includes a first set of pixel rows and a second set of pixel rows arranged alternately in a vertical direction, wherein said control unit switches among a plurality of display modes including a tracking three-dimensional display mode, wherein, in said tracking three-dimensional display mode, said control unit causes the switching liquid crystal panel to separate the image data displayed on said display panel to form the right-eye image and the left-eye image that are separated in the horizontal direction adjacent to the observer, wherein, in said tracking three-dimensional display mode, a position of said right-eye image originating from said first set of pixel rows and formed by said switching liquid crystal panel differs in the horizontal direction from a position of said right-eye image originating from said second set of pixel rows and formed by said switching liquid crystal panel, wherein, in said tracking three-dimensional display mode, a position of said left-eye image originating from said first set of pixel rows and formed by said switching liquid crystal panel differs in the horizontal direction from a position of said left-eye image originating from said second set of pixel rows and separated formed by said switching liquid crystal panel, and wherein, in said tracking three-dimensional display mode, the control unit selects either said first set of pixel rows or said second set of pixel rows for display in accordance with said positional information of the observer, and causes pixel data that forms said right-eye image and pixel data that forms said left-eye image to be alternately displayed in the horizontal direction in the selected first or second set of pixels rows so that the observer can continue to see a stereoscopic image even when the observer moves relative to the stereoscopic display device (first configuration).

According to the configuration described above, the image for the right eye that was emitted by the first pixel lines and divided by the switching liquid crystal panel and the image for the right eye that was emitted by the second pixel lines and divided by the switching liquid crystal panel are at different positions along the horizontal direction. Similarly, the image for the left eye that was emitted by the first pixel lines and divided by the switching liquid crystal panel and the image for the left eye that was emitted by the second pixel lines and divided by the switching liquid crystal panel are at different positions along the horizontal direction. In the tracking three-dimensional display mode, the control section selects either the first pixel lines or the second pixel lines to display images in accordance with the position information of the viewer. In other words, the control section selects either the first pixel lines or the second pixel lines so that the image for the right eye is close to the right eye of the viewer and the image for the left eye is close to the left eye of the viewer. This makes it possible to achieve stereoscopic images with a low level of crosstalk in a wide area.

In the first configuration described above, each row of said first set of pixel rows and said second set of pixel rows can include a plurality of pixels arranged at a prescribed pixel pitch in the horizontal direction, and the pixels in the first set of pixel rows and the pixels in the second set of pixel rows can be arranged so as to be offset by half of said pixel pitch in the horizontal direction (second configuration).

In the first or second configuration described above, the switching liquid crystal panel can include: a first substrate; a second substrate disposed to face the first substrate; and a liquid crystal layer sandwiched between the first substrate and the second substrate (third configuration).

In the first configuration described above, the switching liquid crystal panel can include: a first substrate; a second substrate disposed to face the first substrate; a liquid crystal layer sandwiched between the first substrate and the second substrate; a pattern electrode formed on the first substrate; and a common electrode formed in a planar shape on the second substrate, wherein said pattern electrode includes a first set of electrode rows superimposed on said first set of pixel rows in a plan view, and a second set of electrode rows superimposed on said second set of pixel rows in the plan view, wherein each of said first set of electrode rows and said second set of electrode rows includes a plurality of electrodes arranged at a prescribed electrode pitch in the horizontal direction, and wherein the electrodes of said first set of electrode rows and the electrodes of said second set of electrode rows are arranged so as to be offset by ¼ of said electrode pitch in the horizontal direction (fourth configuration).

In the first configuration described above, the switching liquid crystal panel can include: a first substrate; a second substrate disposed to face the first substrate; a liquid crystal layer sandwiched between the first substrate and the second substrate; a first common electrode formed in a planar shape on the first substrate; a first pattern electrode formed on the first substrate; a first insulating film formed between the first common electrode and the first pattern electrode; a second common electrode formed in a planar shape on the second substrate; a second pattern electrode formed on the second substrate; and a second insulating film formed between the second common electrode and the second pattern electrode, wherein the first pattern electrode includes a plurality of electrodes arranged at a prescribed electrode pitch in the horizontal direction, wherein the second pattern electrode includes a first set of electrode rows superimposed on the first set of pixel rows in a plan view a and second set of electrode rows that overlap said second set of pixel rows in the plan view, wherein the first set of electrode rows and the second set of electrode rows include a plurality of electrodes arranged at said electrode pitch in the horizontal direction, and wherein the electrodes of said first electrode rows and the electrodes of said second electrode rows are arranged so as to be offset by ¼ of said electrode pitch in the horizontal direction (fifth configuration).

In the fifth configuration described above, it is preferable that the plurality of display modes include the three-dimensional display mode, wherein, in the tracking three-dimensional display mode, the control unit causes the switching liquid crystal panel to separate the image displayed on the display panel into the right-eye image and left-eye image in the horizontal direction, and wherein the control unit, in the tracking three-dimensional display mode, in accordance with the positional information of the observer, causes the pixel data that forms the right-eye image and the pixel data that forms the left-eye image to be alternately displayed in the horizontal direction in either the first or second pixels rows (sixth configuration).

According to the configurations described above, in the three-dimensional display mode, the control section causes both the first pixel lines and the second pixel lines to display images. For this reason, it is possible to improve resolution and luminance in the three-dimensional display mode.

In any one of the third to sixth configurations described above, when there is no potential difference between the first substrate and the second substrate, an orientation direction of liquid crystal molecules of the liquid crystal layer on a side of the first substrate and an orientation direction thereof on a side of the second substrate can be substantially parallel (seventh configuration).

In any one of the third to sixth configurations described above, when there is no potential difference between the first substrate and the second substrate, an orientation direction of liquid crystal molecules of the liquid crystal layer on a side of the first substrate and an orientation direction thereof on a side of said second substrate can be substantially orthogonal (eighth configuration).

In any one of the first to eighth configurations described above, it is preferable that the switching liquid crystal panel further include a polarizing plate disposed on a side of the observer (ninth configuration).

According to the configurations described above, it is possible to block light other than the directions covered by the refractive index distribution of the liquid crystal layer, and reduce crosstalk.

In any of the first to ninth configurations described above, the display panel may be a liquid crystal display panel (tenth configuration).

<Embodiments>

Embodiments of the present invention will be described in detail below with reference to diagrams. Identical or equivalent portions will be given identical reference characters in diagrams, and description thereof will not be repeated. Note that, in the referenced diagrams below, configurations are simplified or schematically illustrated and some components are omitted to facilitate understanding of the description. Additionally, dimensional ratios between components shown in each diagram do not necessarily show actual dimensional ratios.

<Embodiment 1>

FIG. 1 is a schematic cross-sectional view showing a configuration of a stereoscopic display device 1 according to Embodiment 1 of the present invention. The stereoscopic display device 1 is equipped with a display panel 10, a switching liquid crystal panel 20, and an adhesive resin 30. The display panel 10 and the switching liquid crystal panel 20 are disposed so as to overlap each other, and are bonded by the adhesive resin 30.

The display panel 10 is equipped with a TFT (Thin Film Transistor) substrate 11, a CF (Color Filter) substrate 12, a liquid crystal layer 13, and polarizing plates 14 and 15. The display panel 10 manipulates the orientation of the liquid crystal molecules in the liquid crystal layer 13 by controlling the TFT substrate 11 and the CF substrate 12. The display panel 10 is illuminated with light from a backlight unit (not shown in the diagram). The display panel 10 displays images by adjusting the transmittance of light for each pixel using the liquid crystal layer 13 and the polarizing plates 14 and 15.

The switching liquid crystal panel 20 is equipped with a first substrate 21, a second substrate 22, a liquid crystal layer 23, and a polarizing plate 24. The first substrate 21 and the second substrate 22 are disposed to face each other. The liquid crystal layer 23 is sandwiched between the first substrate 21 and the second substrate 22. The polarizing plate 24 is disposed on the side of a viewer 90 (the side opposite to the display panel 10).

In order to increase retardation, the liquid crystal layer 23 of the switching liquid crystal panel 20 is configured to be thicker than the liquid crystal layer of a switching liquid crystal panel of a parallax barrier system.

Although not shown in detailed configuration in FIG. 1, electrodes are respectively formed on the first substrate 21 and the second substrate 22. The switching liquid crystal panel 20 manipulates the orientation of the liquid crystal molecules in the liquid crystal layer 23 by controlling the potentials of these electrodes, and changes the behavior of light passing through the liquid crystal layer 23. Details of the structures and the operation of the first substrate 21 and the second substrate 22 will be described later.

Hereinafter, a direction parallel to a line segment connecting a left eye 90L and a right eye 90R of the viewer 90 when the viewer 90 and the stereoscopic display device 1 directly face each other as shown in FIG. 1 (x-direction in FIG. 1) will be called the horizontal direction. Additionally, a direction that is perpendicular to the horizontal direction in the same plane as the display panel 10 (y-direction in FIG. 1) will be called the vertical direction.

Figure 2:
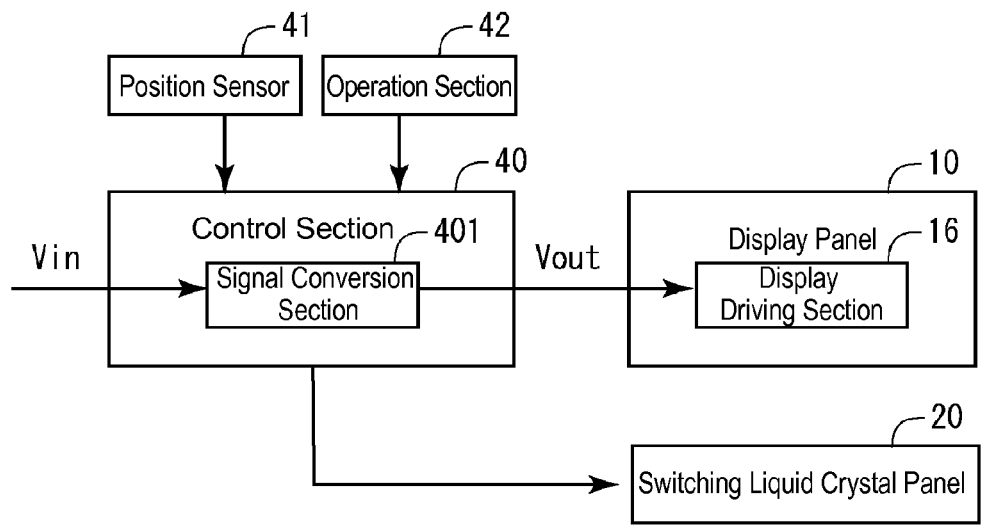
FIG. 2 is a block diagram showing a functional configuration of a stereoscopic display device.

FIG. 2 is a block diagram showing a functional configuration of the stereoscopic display device 1. The stereoscopic display device 1 is further equipped with a control section 40, a position sensor 41, and an operation section 42.

The stereoscopic display device 1 has, as display modes, a two-dimensional display mode, a three-dimensional display mode, and a tracking three-dimensional display mode. The control section 40 switches between these display modes. The control section 40 controls the display panel 10 and the switching liquid crystal panel 20 according to the display mode.

The control section 40 contains a signal conversion portion 401. The signal conversion portion 401 converts input signals $V_{in}$ according to the display mode, and supplies output signals $V_{out}$ to a display driving section 16 of the display panel 10. The display driving section 16 is a gate driver and a source driver, for example.

The position sensor 41 acquires position information of the viewer 90. The position sensor 41 is, for example, an eye tracking system that obtains an image using a camera and detects the position of the eyes of the viewer 90 by image processing. The position sensor 41 may also be a head tracking system that detects the position of the head of the viewer 90 using infrared. The position sensor 41 supplies the acquired position information to the control section 40.

The operation section 42 receives an input from the user and supplies the information received to the control section 40. The user operates the operation section 42 to switch among the display modes of the stereoscopic display device 1.

Figure 3:
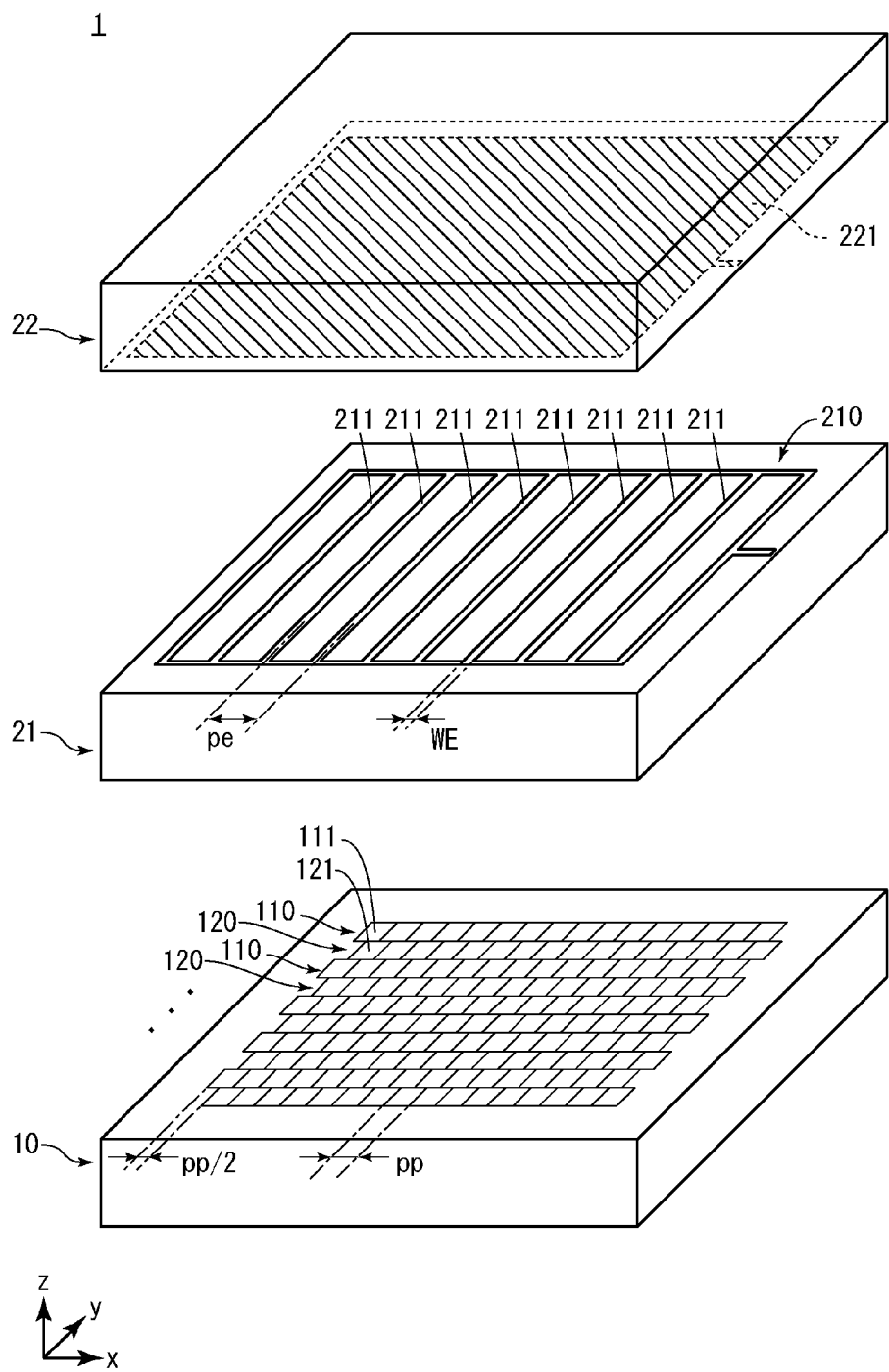
FIG. 3 shows schematic diagrams of configurations of a first substrate and a second substrate of a switching liquid crystal panel and a pixel arrangement of a display panel.

FIG. 3 shows schematic views of configurations of the first substrate 21 and the second substrate 22 of the switching liquid crystal panel 20, and a pixel arrangement of the display panel 10. In FIG. 3, hatching is applied to a common electrode 221. This is done for clarity of illustration, and is not intended to represent a cross-sectional structure.

On the first substrate 21, a pattern electrode 210 is formed. The pattern electrode 210 contains a plurality of electrodes 211 lined up along the horizontal direction at an electrode pitch pe. Each of the electrodes 211 has a width WE in the horizontal direction, and is extended in the vertical direction.

The common electrode 221 is formed in a planar shape on the second substrate 22. It is preferable that the common electrode 221 be formed in substantially the entire surface of the second substrate 22.

The first substrate 21 and the second substrate 22 are glass substrates, for example. The electrodes 211 and the common electrode 221 are ITO (Indium Tin Oxide), for example. The electrodes 211 and the common electrode 221 are deposited by CVD (Chemical Vapor Deposition) or sputtering and formed into patterns by photolithography, for example.

The control section 40 controls the potentials of the electrodes 211 and the potential of the common electrode 221, and forms an electric field in the liquid crystal layer 23.

Figure 4:
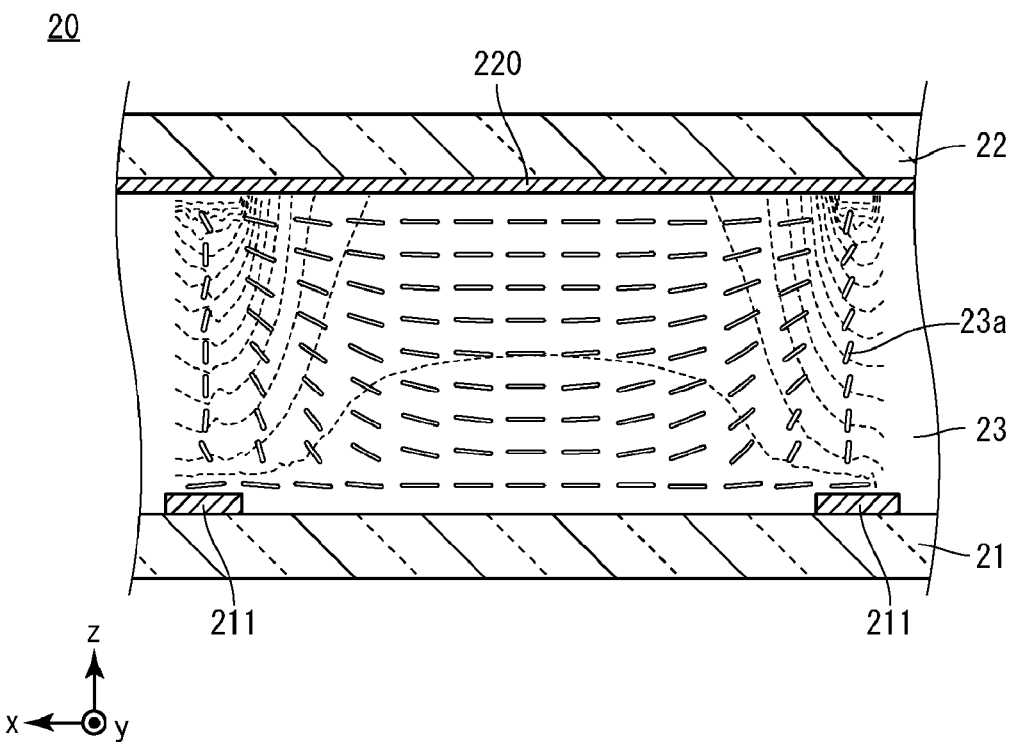
FIG. 4 is a schematic diagram showing orientations of liquid crystal molecules of a liquid crystal layer of a switching liquid crystal panel when an electric field is formed in a liquid crystal layer.
Figure 5:
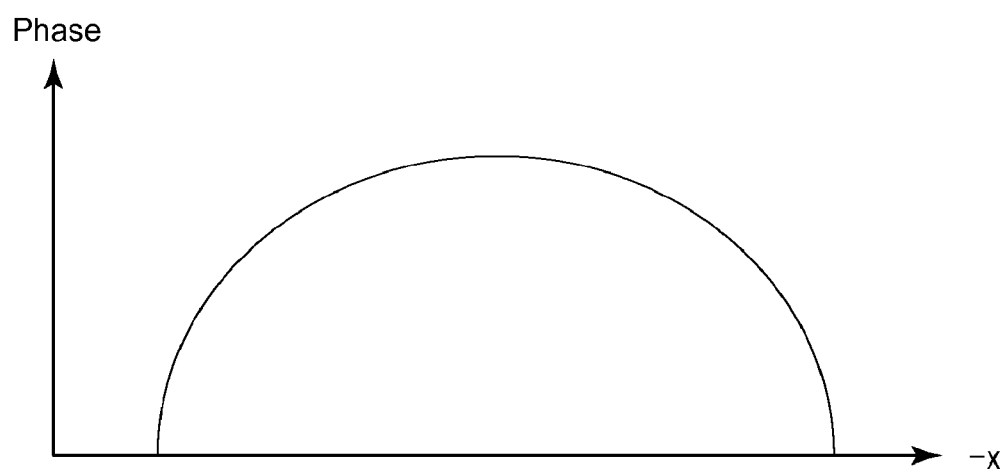
FIG. 5 is a phase profile along a horizontal direction of a liquid crystal layer.

FIG. 4 is a schematic diagram showing orientations of liquid crystal molecules 23a inside the liquid crystal layer 23 when an electric field is formed in the liquid crystal layer 23. FIG. 5 is a phase profile of the liquid crystal layer 23 along the horizontal direction. The liquid crystal molecules 23a orient along the lines of electric force shown in dashed lines in FIG. 4. For this reason, the molecular long axes of the liquid crystal molecules 23a orient along the thickness direction of the liquid crystal layer 23 (z-direction) near the electrodes 211. In contrast, in the middle of two electrodes 211, the molecular long axes of the liquid crystal molecules 23a orient along the horizontal direction (x-direction).

As a result of this distribution of the orientations of the liquid crystal molecules 23a, the liquid crystal layer 23 has a refractive index distribution along the horizontal direction (x-direction). Consequently, the liquid crystal layer 23 generates a lens effect, which changes optical path. Using this lens effect, the switching liquid crystal panel 20 divides an image displayed on the display panel 10 into an image for the right eye and an image for the left eye.

The description will be continued with further reference to FIG. 3. The display panel 10 includes U lines (first pixel lines) 110 and B lines (second pixel lines) 120 arranged alternately in the vertical direction. The U lines 110 include a plurality of pixels 111 lined up along the horizontal direction at a pixel pitch pp. Similarly, the B lines 120 include a plurality of pixels 121 lined up along the horizontal direction at the pixel pitch pp.

The pixels 111 of the U lines 110 and the pixels 121 of the B lines 120 are arranged so as to be staggered in the horizontal direction by only one half of the pixel pitch pp (pp/2). As a result, light emitted by the U lines 110 and divided by the switching liquid crystal panel 20 is at a different position in the horizontal direction from light emitted by the B lines 120 and divided by the switching liquid crystal panel 20. More specifically, an image for the right eye emitted by the U lines 110 and divided by the switching liquid crystal panel 20 is at a different position in the horizontal direction from an image for the right eye emitted by the B lines 120 and divided by the switching liquid crystal panel 20. Similarly, an image for the left eye emitted by the U lines 110 and divided by the switching liquid crystal panel 20 is at a different position in the horizontal direction from an image for the left eye emitted by the B lines 120 and divided by the switching liquid crystal panel 20.

Note that the electrode pitch pe is approximately twice the pixel pitch pp.

Next, a configuration of the switching liquid crystal panel 20 will be described in detail with reference to FIGS. 6 to 9. The switching liquid crystal panel 20 is classified as a homogenous orientation or a TN (twisted nematic) orientation, depending on the orientation of the liquid crystal molecules 23a of the liquid crystal layer 23. The switching liquid crystal panel 20 according to the present embodiment can employ both the homogenous orientation and the TN orientation.

<Homogenous Orientation>

Figure 6:
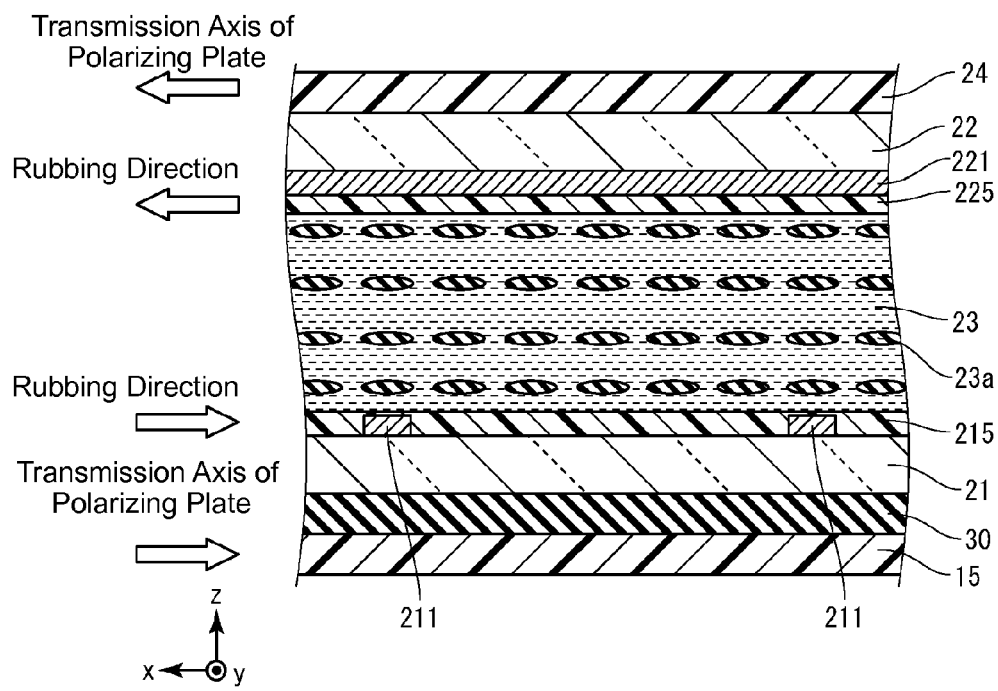
FIG. 6 is a schematic cross-sectional view showing a configuration of a switching liquid crystal panel in a homogeneous orientation (off state).
Figure 7:
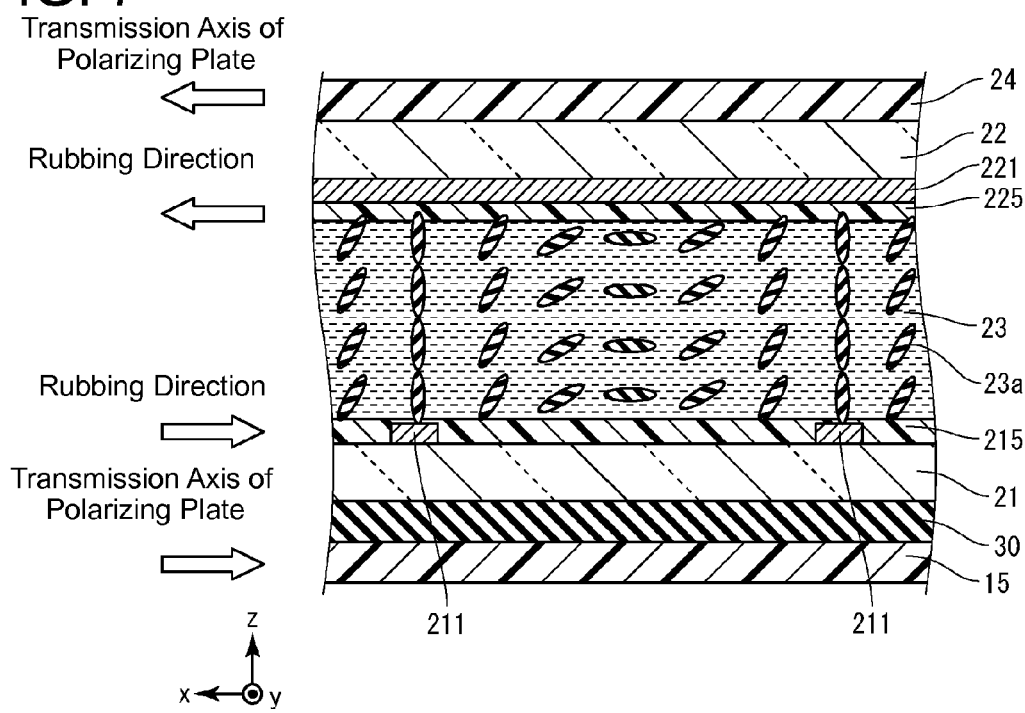
FIG. 7 is a schematic cross-sectional view showing a configuration of a switching liquid crystal panel in a homogeneous orientation (on state).

FIGS. 6 and 7 are schematic cross-sectional views showing configurations of the switching liquid crystal panel 20 in the homogenous orientation. FIG. 6 schematically shows cases in which there is no potential difference between the electrodes 211 and the common electrode 221, while FIG. 7 schematically shows cases in which there is a potential difference between the electrodes 211 and the common electrode 221.

In the homogenous orientation, an alignment film 215 formed on the first substrate 21 and an alignment film 225 formed on the second substrate 22 are rubbed in anti-parallel directions. As a result, the orientation of the liquid crystal molecules 23a of the liquid crystal layer 23 on the side of the first substrate 21 and the orientation thereof on the side of the second substrate 22 are substantially parallel to each other when there is no potential difference between the first substrate 21 and the second substrate 22.

The rubbing direction of the alignment film 215 of the first substrate 21 is parallel to the direction of the transmission axis of the polarizer plate 15 on the display surface side of the display panel 10. In other words, the direction of the polarization axis of light incident to the switching liquid crystal panel 20 matches the rubbing direction of the alignment film 215. Note that these directions can be matched using a retardation plate.

When there is no potential difference between the electrodes 211 and the common electrode 221, the liquid crystal molecules 23a are uniformly oriented, and no refractive index distribution occurs. Therefore, the switching liquid crystal panel 20 does not have a lens effect. In contrast, as mentioned above, when there is a potential difference between the electrodes 211 and the common electrode 221, the switching liquid crystal panel 20 has a lens effect.

The direction of the transmission axis of the polarizing plate 24 of the switching liquid crystal panel 20 is parallel to the direction of the transmission axis of the polarizing plate 15 on the display surface side of the display panel 10 and the rubbing directions of the alignment films 215 and 225. While configuration of the polarizing plate 24 is not necessary, placing the polarizing plate 24 makes it possible to block light other than the directions of the refractive index distribution of the liquid crystal layer 23 (light not properly separated by the lens). This makes it possible to reduce crosstalk.

<TN Orientation>

FIGS. 8 and 9 are schematic cross-sectional views of configurations of the switching liquid crystal panel 20 in the TN orientation. FIG. 8 schematically shows cases in which there is no potential difference between the electrodes 211 and the common electrode 221, while FIG. 9 schematically shows cases in which there is a potential difference between the electrodes 211 and the common electrode 221.

In the TN orientation, an alignment film 215 formed on the first substrate 21 and an alignment film 225 formed on the second substrate 22 are rubbed in orthogonal directions. As a result, the orientation of the liquid crystal molecules 23a of the liquid crystal layer 23 on the side of the first substrate 21 and the orientation of thereof on the side of the second substrate 22 are substantially orthogonal to each other when there is no potential difference between the first substrate 21 and the second substrate 22.

The rubbing direction of the alignment film 215 is parallel to the direction of the transmission axis of the polarizer plate 15 in a manner similar to the homogenous orientation. Additionally, instead of making the rubbing direction of the alignment film 215 and the direction of the transmission axis of the polarizing plate 15 parallel to each other, a retardation plate may be used.

When there is no potential difference between the electrodes 211 and the common electrode 221, the switching liquid crystal panel 20 does not have a lens effect in a manner similar to the homogenous orientation. In contrast, when there is a potential difference between the electrodes 211 and the common electrode 221, the switching liquid crystal panel 20 has a lens effect.

The direction of the transmission axis of the polarizing plate 24 is parallel to the alignment film 225 of the second substrate 22. While configuration of the polarizing plate 24 is not necessary, placing the polarizing plate 24 makes it possible to reduce crosstalk in the following manner.

First, it is possible to block light in a direction other than the directions of the refractive index distribution of the liquid crystal layer 23 in a manner similar to the homogenous orientation. Further, in the case of the TN orientation, it is possible to block light near the electrodes 211, where liquid crystal orientation is easily disturbed. In other words, in the TN orientation, the polarization axis of light passing through the liquid crystal layer 23 rotates as the orientation of the liquid crystal molecules 23a rotates within the x-y plane. However, near the electrodes 211, the liquid crystal molecules 23a are oriented along the z-axis direction. For this reason, the polarization axis of light passing through this portion does not rotate, but is blocked by the polarizing plate 24. This makes it possible to further reduce crosstalk.

Configurations of the switching liquid crystal panel 20 were described above. In the above description, an example in which the pattern electrode 210 is formed on the first substrate 21 and the common electrode 221 is formed on the second substrate 22 was used. However, the pattern electrode 210 may be formed on the second substrate 22 and the common electrode 221 may be formed on the first substrate 21.

An example in which an electric field is formed using one level of potential difference was described above. However, a more complex electric field may be formed by, for example, supplying the electrode 221 with a plurality of levels of potential differences.

In the above description, liquid crystal molecules with a positive dielectric anisotropy are used as the liquid crystal molecules 23a in the liquid crystal layer 23. However, liquid crystal molecules with a negative dielectric anisotropy may be used as the liquid crystal molecules 23a in the liquid crystal layer 23.

Next, the operation of the stereoscopic display device 1 will be described. FIG. 10 is a table summarizing operations of the stereoscopic display device 1 in each display mode. As mentioned above, the control section 40 switches between the two-dimensional display mode, the three-dimensional display mode, and the tracking three-dimensional display mode.

As shown in FIG. 10, in the two-dimensional display mode, the control section 40 turns off the switching liquid crystal panel 20, while turning on both the U lines 110 and the B lines 120. In the three-dimensional display mode, the control section 40 turns on the switching liquid crystal panel 20, and turns either the U lines 110 or the B lines 120. In the tracking three-dimensional display mode, the control section 40 turns on the switching liquid crystal panel 20 and turns on either the U lines 110 or the B lines 120 in accordance with the position information supplied by the position sensor 41.

<Two-Dimensional Display Mode>

In the two-dimensional display mode, the control section 40 turns off the switching liquid crystal panel 20. In other words, the control section 40 prevents a potential difference from occurring between the electrodes 211 and the common electrode 221. Specifically, the control section 40 keeps the potential of the electrodes 211 and the potential of the common electrode 221 at a common, fixed potential (a ground potential, for example), or drives the electrodes 211 and the common electrode 221 with in-phase voltages. As a result, the switching liquid crystal panel 20 does not have a lens effect, and an image displayed on the display panel 10 is passed through the switching liquid crystal panel 20 almost as-is.

In the two-dimensional display mode, the control section 40 turns on both the U lines 110 and the B lines 120. In other words, the control section 40 causes both the U lines 110 and the B lines 120 to display images.

The stereoscopic display device 1 turns off the switching liquid crystal panel 20 to prevent the display quality of the display panel 10 from deteriorating in the two-dimensional display mode. In other words, in the two-dimensional display mode, it is possible to achieve a resolution equivalent to 100% of the resolution of the display panel 10 and a luminance equivalent to 100% of the luminance of the display panel 10.

<Three-Dimensional Display Mode>

In the three-dimensional display mode, the control section 40 turns on the switching liquid crystal panel 20. In other words, the control section 40 generates a potential difference between the electrodes 211 and the common electrode 221. Specifically, the control section 40 sets either the potential of the electrodes 211 or the potential of the common electrode 221 to a ground potential and applies a square wave AC voltage to the other, or drives the electrodes 211 and the common electrode 221 with antiphase voltages. As a result, the switching liquid crystal panel 20 has a lens effect, and an image displayed on the display panel 10 is divided into an image for the right eye and an image for the left eye along the horizontal direction.

In the three-dimensional display mode, the control section 40 turns on either the U lines 110 or B lines 120. In other words, the control section 40 causes either the U lines 110 or the B lines 120 to display images. FIG. 11 is a plan view that schematically shows the manner in which the display panel 10 realizes display in the three-dimensional display mode. In FIG. 11, the control section 40 turns the U lines 110 on and the B lines 120 off. The control section 40 causes pixels 111 of the U lines 110 to alternately display pixel data (R) constituting an image for the right eye and pixel data (L) constituting an image for the left eye.

FIG. 12 is a diagram that schematically shows light emitted by the display panel 10. FIG. 12 schematically shows a virtual lenticular sheet 200 formed by the switching liquid crystal panel 20. As shown in FIG. 12, an image displayed on the display panel 10 is divided into an image for the right eye and an image for the left eye along the horizontal direction. When the viewer 90 views the stereoscopic display device 1 from an appropriate position, an image for the right eye is projected into the right eye 90R and an image for the left eye is projected into the left eye 90L. As a result, the image displayed on the display panel 10 is recognized as a three-dimensional image by the viewer 90.

FIG. 12 schematically shows a distribution of a luminance $A_L$ of an image for the left eye in a dashed line and a distribution of a luminance $A_R$ of an image for the right eye in an alternate long and short dashed line. In FIG. 12, the luminance $A_L$ of an image for the left eye is highest at the position of the left eye 90L, and the luminance $A_R$ of an image for the right eye is highest at the position of the right eye 90R.

When the viewer 90 moves from this position, the luminance $A_L$ of an image for the left eye decreases and the luminance $A_R$ of an image for the right eye increases where the left eye 90L is positioned. Similarly, where the right eye 90R is positioned, the luminance $A_R$ of an image for the right eye decreases and the luminance $A_L$ of an image for the left eye increases. As a result, an image for the right eye enters the left eye 90L, and an image for the left eye enters the right eye 90R. This phenomenon is called crosstalk, which, when significantly high, not only compromises the stereoscopic effect but also causes discomfort for the viewer 90.

Figure 13:
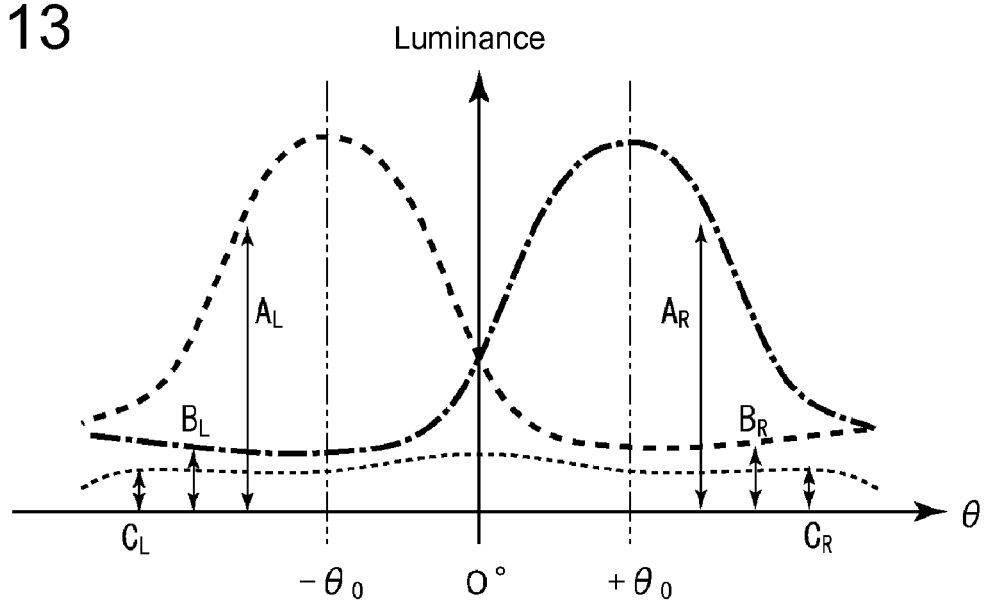
FIG. 13 shows angular properties of luminance of a stereoscopic display device.

Crosstalk will be defined quantitatively using FIG. 13. FIG. 13 shows angular properties of luminance of the stereoscopic display device 1. A luminance $A_L$ is the luminance observed at an angle $\theta<0$ when a black display is used as an image for the right eye and a white display is used as an image for the left eye. A luminance $B_R$ is the luminance observed at an angle $\theta>0$ on the same screen. A luminance $A_R$ is the luminance observed at an angle $\theta>0$ when a white display is used as an image for the right eye and a black display is used an image for the left eye. A luminance $B_L$ is the luminance observed at angle $\theta<0$ on the same screen. A luminance $C_L$ is the luminance observed at an angle $\theta<0$ when a black display used for both an image for the right eye and an image for the left eye. A luminance $C_R$ is the luminance observed at an angle $\theta>0$ on the same screen.

In this case, a crosstalk in the left eye XT (L) is defined using the following equation:

$$XT(L)[\%] = \frac{B_L(\theta) - C_L(\theta)}{A_L(\theta) - C_L(\theta)} \times 100 \qquad \text{<Equation 3>}$$

Similarly, a crosstalk in the right eye XT (R) is defined using the following equation:

$$XT(R)[\%] = \frac{B_R(\theta) - C_R(\theta)}{A_R(\theta) - C_R(\theta)} \times 100 \qquad \text{<Equation 4>}$$

Figure 14:
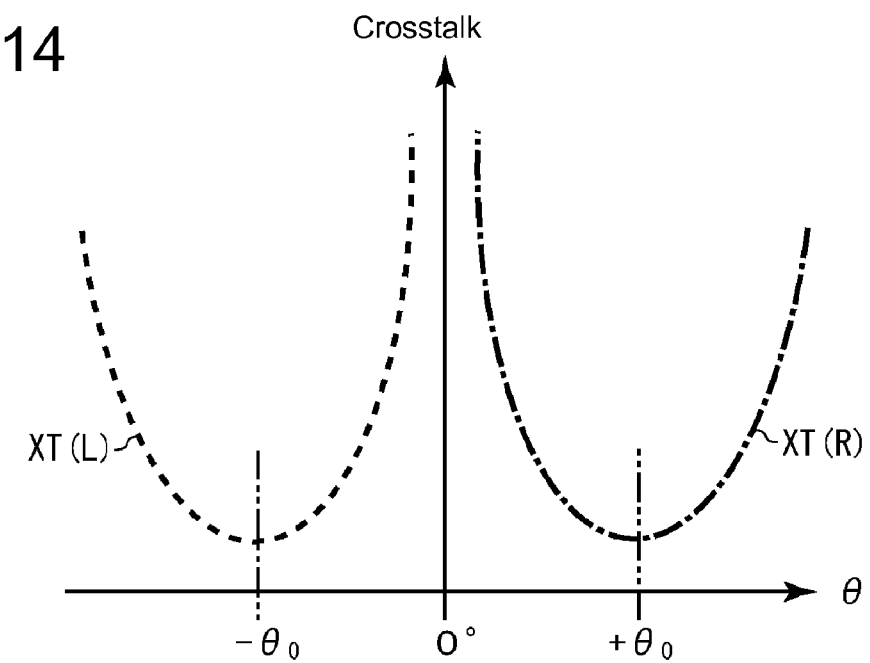
FIG. 14 is a diagram showing crosstalk in the left eye XT (L) and a crosstalk in the right eye XT (R).

FIG. 14 is a diagram showing angular properties of the crosstalk in the left eye XT (L) and the crosstalk in the right eye XT (R). The value of the crosstalk in the left eye XT (L) is the lowest an angle $-\theta_0$, and increases in accordance with the deviation from the angle $-\theta_0$. Similarly, the value of the crosstalk in the right eye XT (R) is the lowest at an angle $+\theta_0$ and increases in accordance with the deviation from the angle $+\theta_0$.

Note that it is possible to reduce crosstalk by optimizing the retardation of the liquid crystal layer 23 of the switching liquid crystal panel 20 and the electrode width WE of the electrodes 211. In other words, it is possible to reduce crosstalk in a wide area.

<Tracking Three-Dimensional Display Mode>

In the tracking three-dimensional display mode, the control section 40 turns on the switching liquid crystal panel 20 and turns on either the U lines 110 or the B lines 120 according to the position information supplied by the position sensor 41. Operations of the tracking three-dimensional display mode will be described using FIGS. 15 to 17 below.

Figure 15:
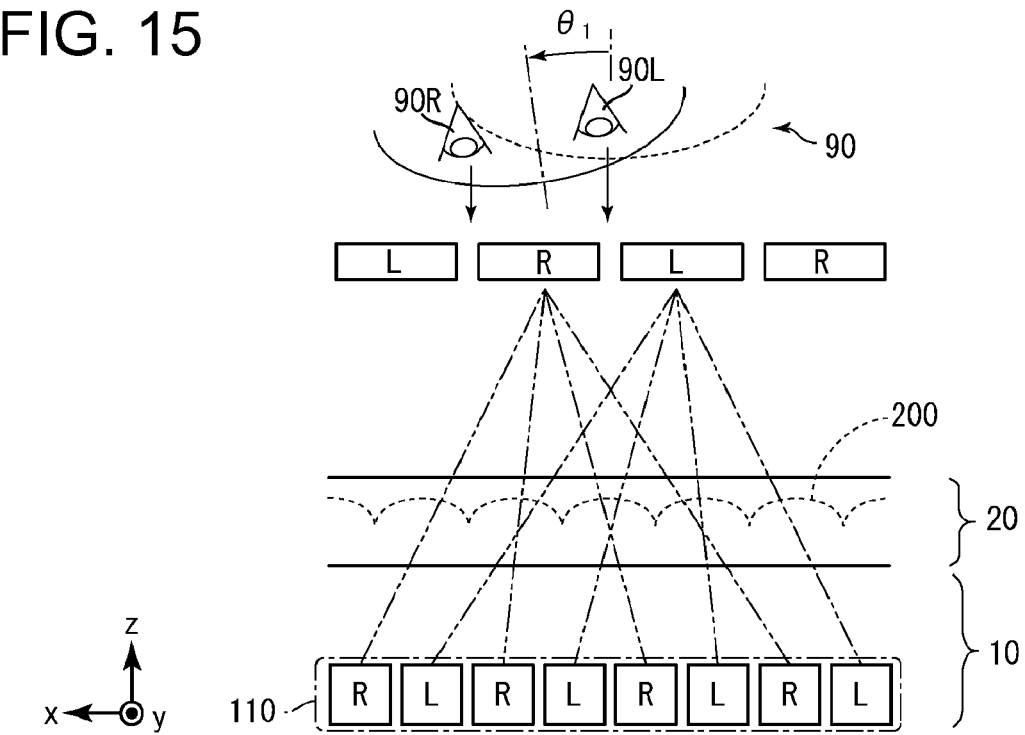
FIG. 15 is a diagram for describing an operation in a tracking three-dimensional display mode.

FIG. 15 shows a state in which the viewer 90 has moved to an area with a high level of crosstalk. In FIG. 15, the control section 40 has the U lines 110 turned on and the B lines 120 turned off. The control section 40 causes the U lines 110 to alternately display the pixel data constituting an image for the right eye and the pixel data constituting an image for the left eye.

Figure 16:
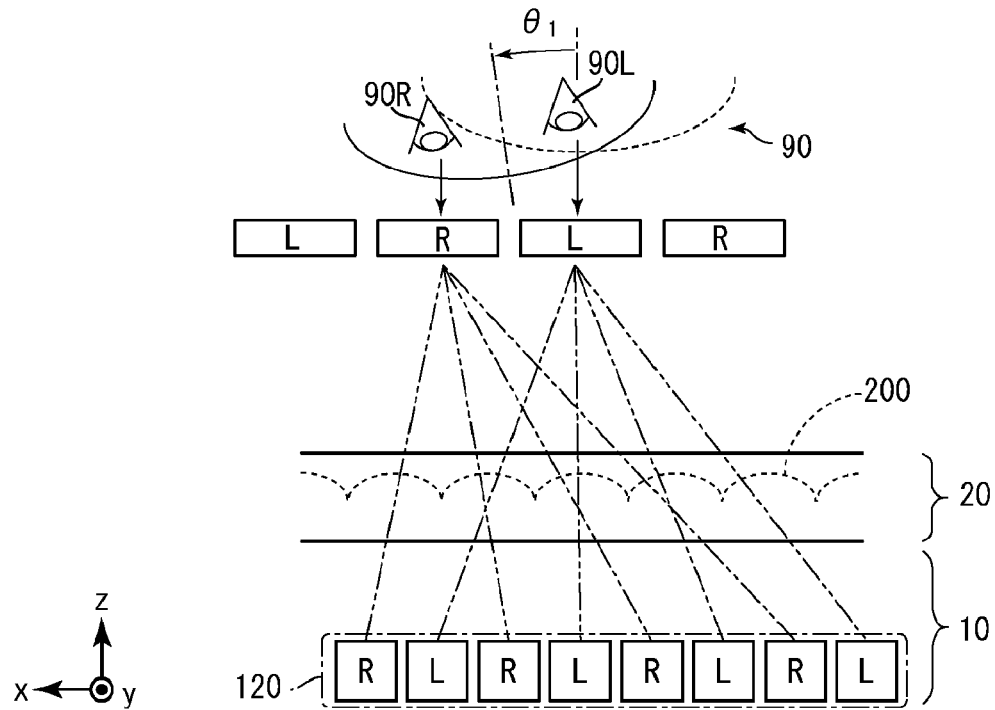
FIG. 16 is a diagram for describing an operation in a tracking three-dimensional display mode.

The control section 40 reverses the on/off state of the U lines 110 and the B lines 120 when, for example, the angle between the line segment connecting the center of the stereoscopic display device 1 and the viewer 90 and the normal line of the display panel 10 is greater than or equal to a prescribed value $\theta_1$. In other words, the control section 40 turns on the B lines 120 and turns off the U lines 110, as shown in FIG. 16. At this time, the control section 40 causes the B lines 120 to alternately display the pixel data constituting an image for the right eye and the pixel data constituting an image for the left eye.

As mentioned above, an image for the right eye and an image for the left eye emitted by the U lines 110 and divided by the switching liquid crystal panel 20 are at different positions along the horizontal direction from an image for the right eye and an image for the left eye emitted by the B lines 120 and divided by the switching liquid crystal panel 20. More specifically, these images are staggered along the horizontal direction by only one half of an inter-view distance. In other words, the center of an image for the right eye (where luminance is the greatest) emitted by the B lines 120 and divided by the switching liquid crystal panel 20 is a mid-point between the center of an image for the right eye and the center of an image for the left eye emitted by the U lines 110 and divided by the switching liquid crystal panel 20. Similarly, the center of an image for the left eye emitted by the B lines 120 and divided by the switching liquid crystal panel 20 is a mid-point between the center of an image for the right eye and the center of an image for the left eye emitted by the U lines 110 and divided by the switching liquid crystal panel 20.

For this reason, an area with a high level of crosstalk when the U lines 110 are turned on is an area with a low level of crosstalk when the B lines 120 are turned on. It follows that, in FIG. 16, the viewer 90 is in an area with a low level of crosstalk.

Thus, the control section 40 turns on either of the U lines 110 or the B lines 120 that generate a lower level of crosstalk, depending on the position of the viewer 90. This makes it possible to reduce crosstalk in a wide angular range.

Figure 17:
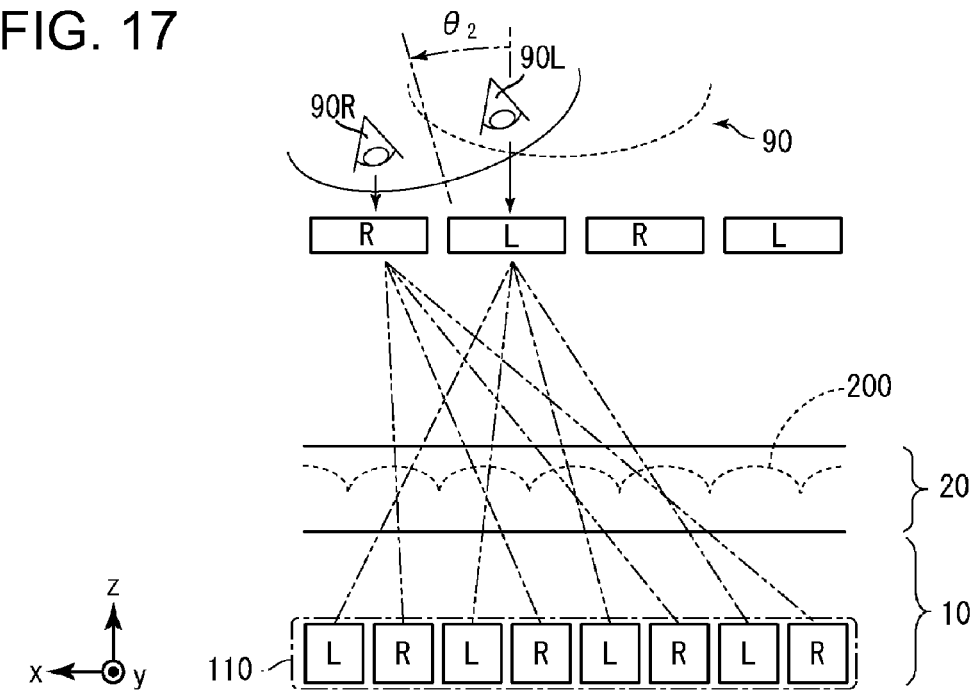
FIG. 17 is a diagram for describing an operation in a tracking three-dimensional display mode.

FIG. 17 shows a state in which the viewer 90 has moved further along the same direction from the position shown in FIG. 16. The control section 40 reverses back the on/off state of the U lines 110 and the B lines 120 when, for example, the angle between the line segment connecting the center of the stereoscopic display device 1 and the viewer 90 and the normal line of the display panel 10 is greater than or equal to a prescribed value $\theta_2$. In other words, the control section 40 turns on the U lines 110 and turns off the B lines 120, as shown in FIG. 17. At this time, the control section 40 causes the U lines 110 to alternately display the pixel data constituting an image for the right eye and the pixel data constituting an image for the left eye.

The control section 40 then reverses the order of the pixel data constituting an image for the right eye and the pixel data constituting an image for the left eye from the order shown in FIG. 15 (left and right image are swapped). This makes it possible to avoid pseudo-stereoscopy (a state in which an image for the left eye is projected into the right eye 90R and an image for the right eye is projected into the left eye 90L).

Thus, when the position of the viewer 90 moves along one direction, the control section 40 causes images to be displayed in the order of: the U lines 110, the B lines 120, the U lines 110 (with left and right image swapped), the B lines 120 (with left and right images swapped), the U lines 110, the B lines 120 . . . and so on. Therefore, even when the head of the viewer 90 moves, it is possible to display a three-dimensional image with a low level of crosstalk in accordance with the position of the head, making it possible to achieve good stereoscopic display in a wide angular range.

The operations of the stereoscopic display device 1 were described above. Effects of the stereoscopic display device 1 will be described below by showing specific configuration examples.

Figure 18:
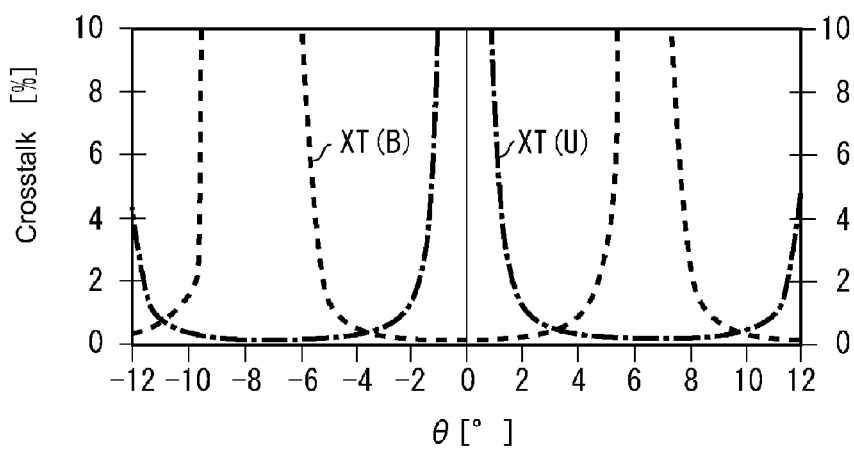
FIG. 18 is a diagram showing angular properties of crosstalk of a stereoscopic display device.
Figure 19:
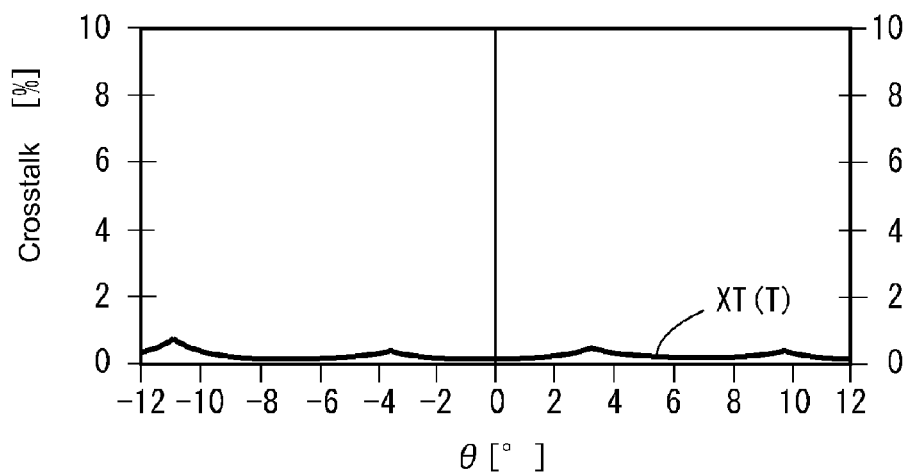
FIG. 19 shows angular properties of crosstalk of a stereoscopic display device in a tracking three-dimensional display mode.

FIGS. 18 and 19 show angular properties of crosstalk of the stereoscopic display device 1. The data was obtained from a stereoscopic display device 1 that is: 20 μm in a thickness d of the liquid crystal layer 23 of the switching liquid crystal panel 20; 191.71 μm in the electrode pitch pe of the electrodes 211; 30 μm in the width WE of the electrodes 211; and 96 μm in the pixel pitch pp of the display panel 10.

In FIG. 18, an XT (U) represents angular properties of crosstalk when only the U lines 110 are turned on, and an XT (B) represents angular properties of crosstalk when only the B lines 120 are turned on. As shown in FIG. 18, the shapes of the XT (U) and the XT (B) are staggered by half a cycle.

As mentioned above, in the tracking three-dimensional mode, the control section 40 turns on either of the U lines 110 or the B lines 120 that generate a lower level of crosstalk based on the position of the viewer 90. Therefore, the angular properties of a crosstalk XT (T) in the tracking three-dimensional display mode are as shown in FIG. 19. In the tracking three-dimensional display mode, it is possible to reduce crosstalk in a wide area, as shown in FIG. 19.

The stereoscopic display device 1 performs tracking by switching between display images of the display panel 10.

For this reason, the stereoscopic display device 1 is able to perform tracking faster than a barrier partition system, which will be described later.

The present embodiment respectively widens the area in which crosstalk is reduced when the U lines 110 are turned on and the area in which crosstalk is reduced when the B lines 120 are turned on by optimizing the retardation of the liquid crystal layer 23 of the switching liquid crystal panel 20 and the electrode width WE of the electrodes 211. When combined with tracking, this can reduce crosstalk in the entire angular range.

Figure 20:
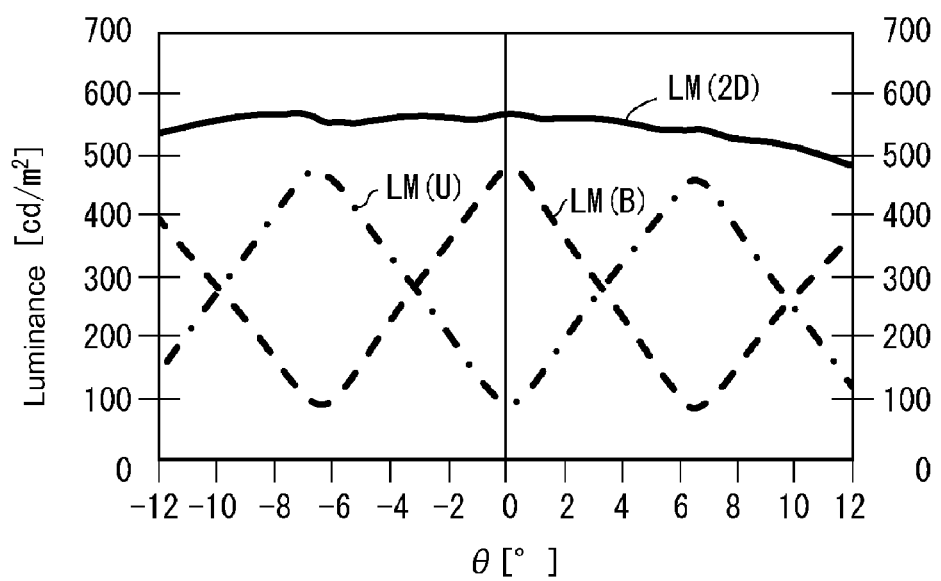
FIG. 20 is a diagram showing angular properties of luminance of a stereoscopic display device.

FIG. 20 is a diagram showing angular properties of luminance of the same stereoscopic display device 1. In FIG. 20, LM (U), LM (B), and LM (2D) respectively show: angular properties of luminance when only the U lines 110 are turned on; angular properties of luminance when only the B lines 120 are turned on; and angular properties of luminance when both the U lines 110 and the B lines 120 are turned on.

In a three-dimensional display mode (in which either the U lines 110 or the B lines 120 are turned on), too, a luminance equivalent to 50 to 60% of the luminance in the two-dimensional display mode is achieved due to the lens effect generated by the switching liquid crystal panel 20.

FIG. 21 is a table showing properties of the stereoscopic display device 1 according to the present embodiment in comparison to other types of stereoscopic display devices. The "tracking ability" column describes whether the response speed is sufficient during tracking. The "quality in 2D" column describes the image quality in the two-dimensional display mode. The "resolution in 2D" column describes the resolution in the two-dimensional display mode as a fraction of the resolution of the display panel. The "luminance in 2D" column describes the luminance in the two-dimensional display mode as a percentage of the luminance of the display panel. The "resolution in 3D" column describes the resolution in the three-dimensional display mode as a fraction of the resolution of the display panel. The "luminance in 3D" column describes the luminance in the three-dimensional display mode as a percentage of the luminance of the display panel. The "3D quality (XT)" column describes the image quality in the three-dimensional display mode. The "XT area" column describes whether or not there is an area with a high level of crosstalk.

An "N-view (fixed lens)" system is a system that interpolates between two views by converting one view into multiple views. In this system, the resolution is 1/N in both the two-dimensional display mode and the three-dimensional display mode. Additionally, the image quality in the three-dimensional display mode is poor.

An "N-view (SW-LCD) system" and an "N-view (fixed barrier) system" are systems that divide an image into N views using a barrier. In the latter system, the resolution is 1/N, and the luminance is also reduced to 100/N % due to the barrier. In the "N-view (SW-LCD) system," the two-dimensional display mode and the three-dimensional display mode are switched using a switching liquid crystal panel. As a result, it is possible to achieve a luminance equivalent to 100% of the luminance in the two-dimensional display mode and a luminance equivalent to 100% of the resolution in the two-dimensional display. However, the luminance and the resolution in the three-dimensional display mode still remain at 1/N.

A "left and right image SWAP (SW-LCD)" system and a "left and right image SWAP (fixed lens)" system are systems that switch an image for the right eye and an image for the left eye by tracking the position of the viewer. These systems make it possible to avoid pseudo-stereoscopy. However, there is always an area with a high level of crosstalk. Additionally, since the "left and right image SWAP (SW-LCD)" system divides an image using a barrier, luminance is decreased by half in the three-dimensional display mode. In the "left and right image SWAP (SW-LCD)" system, images continue to be divided in the two-dimensional display mode, too, and a moiré effect occurs as a result. For this reason, image quality is poor in the two-dimensional display mode.

A "barrier partition (SW-LCD)" system is a system that changes the position of the barrier according to the position of the viewer by closely controlling the liquid crystal molecules of the switching liquid crystal panel. This makes it possible to eliminate areas with a high level of crosstalk. However, since the position of the barrier is changed by driving liquid crystal, the response speed is not sufficient. Additionally, since an image is divided by a barrier, luminance is reduced by half in the three-dimensional display mode.

According to the present embodiment, it is possible to reduce the level of crosstalk across a wide region in the tracking three-dimensional display mode. In the present embodiment, since tracking is performed by switching the displays of the display panel 10, the response speed is sufficient. Additionally, in the two-dimensional display mode, it is possible to achieve a resolution equivalent to 100% of the resolution of the display panel 10 and a luminance equivalent to 100% of the luminance of the display panel 10 by turning off the switching liquid crystal panel 20.

It is preferable that the stereoscopic display device 1 be designed such that an image for the right eye and an image for the left eye emitted by the U lines 110 and divided by the switching liquid crystal panel 20 and an image for the right eye and an image for the left eye emitted by the B lines 120 and divided by the switching liquid crystal panel 20 are respectively staggered by only one half of an inter-view distance, as is the case with the present embodiment. In other words, it is preferable that stereoscopic display device 1 be designed such that the LM (U) and the LM (B) are staggered by only one half of a cycle. However, some effect is achievable provided that an image for the right eye and an image for the left eye emitted by the U lines 110 and divided by the switching liquid crystal panel 20 are at different positions along the horizontal direction from an image for the right eye and an image for the left eye emitted by the B lines 120 and divided by the switching liquid crystal panel 20.

<Embodiment 2>

Figure 22:
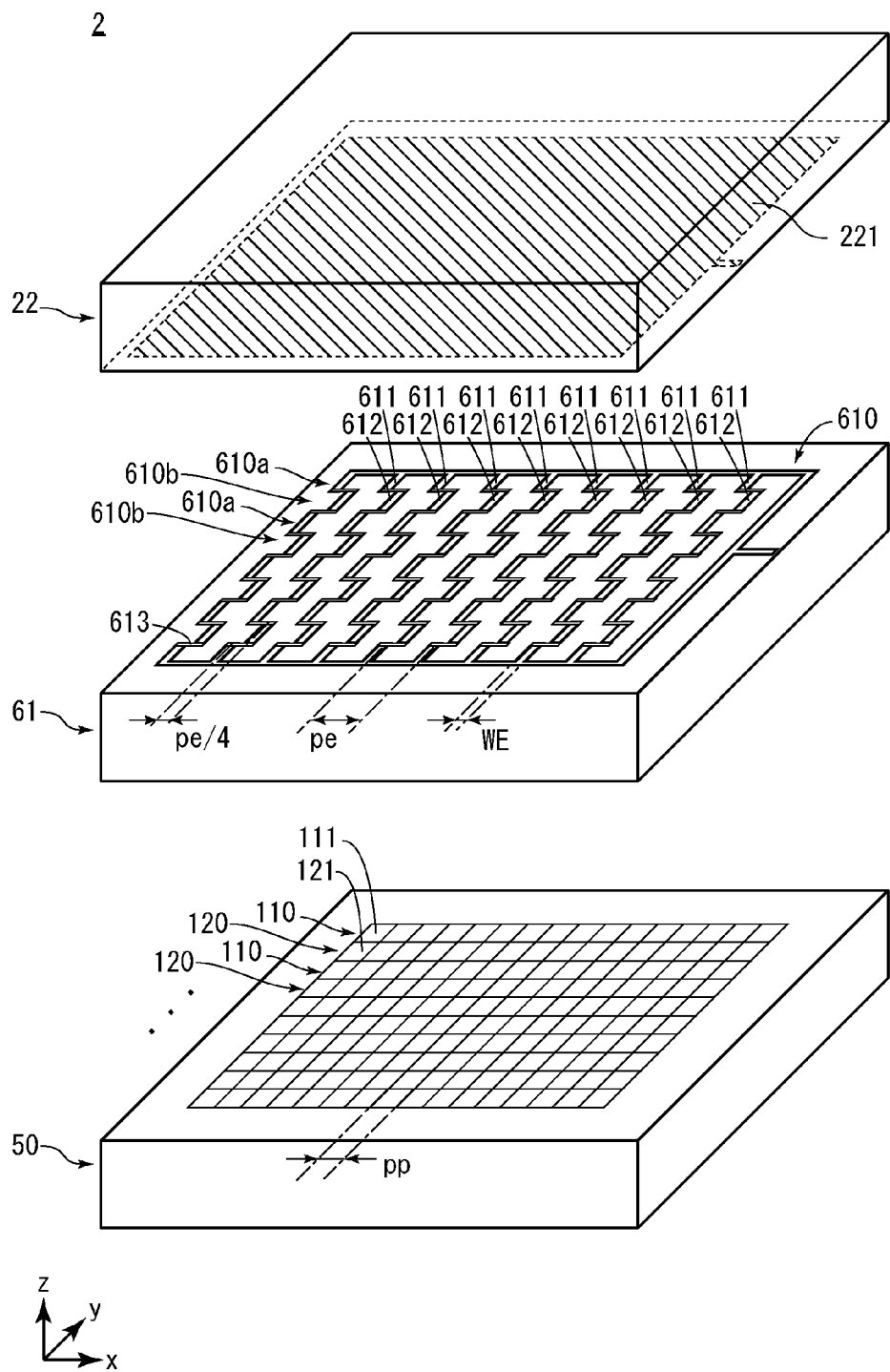
FIG. 22 shows schematic diagrams of configurations of a first substrate and a second substrate of a switching liquid crystal panel, and a pixel arrangement of a display panel according to Embodiment 2 of the present invention.

A stereoscopic display device 2 according to Embodiment 2 is equipped with a display panel 50 in lieu of the display panel 10 of the stereoscopic display device 1. Further, the stereoscopic display 2 has a switching liquid crystal panel with a different configuration. The switching liquid crystal panel of the stereoscopic display device 2 has a first substrate 61 in lieu of the first substrate 21. FIG. 22 is a schematic diagram showing configurations of the first substrate 61 and a second substrate 22 of the switching liquid crystal panel of the stereoscopic display device 2, and a pixel arrangement of the display panel 50. In FIG. 22, hatching is applied to a common electrode 221, but this is done for clarity of illustration, and is not intended to represent a cross-sectional structure.

The display panel 50 has a different pixel arrangement from the pixel arrangement of the display panel 10. In the display panel 50, pixels 111 of U lines 110 and pixels 121 of B lines 120 are aligned along the horizontal direction. In other words, the pixel arrangement of the display panel 50 is a matrix pixel arrangement.

On the first substrate 61, a pattern electrode 610 is formed. The pattern electrode 610 contains first electrode lines 610a, which overlap the U lines 110 from a plan view, and second electrode lines 610b, which overlap the B lines 120 from a plan view.

The first electrode lines 610a contain a plurality of electrodes 611 lined up along the horizontal direction at an electrode pitch pe. Similarly, the second electrode lines 610b contain a plurality of electrodes 612 lined up along the horizontal direction at the electrode pitch pe.

The electrodes 611 of the first electrode lines 610a and the electrodes 612 of the second electrode lines 610b are disposed so as to be staggered along the horizontal direction by only ¼ of the electrode pitch pe. Each of the electrodes 611 and 612 has a width WE, and is extended along the vertical direction. The electrodes 611 and the electrodes 612 that are adjacent to each other are electrically connected by connecting portions 613.

The electrodes 611 and 612 are ITO, deposited by CVD or sputtering, and patterned by photolithography, for example.

It is preferable that the connecting portions 613 be formed as thin as possible, so as not to disturb the orientation of liquid crystal molecules 23a of a liquid crystal layer 23. For this reason, it is preferable that the connecting portions 613 be formed with a material with a higher electrical conductivity than the material(s) used for the electrodes 611 and 612, although the material(s) used for the electrodes 611 and 612 are acceptable. The connecting portion 613 is a metal film, deposited by sputtering, and patterned by photolithography, for example.

According to the configuration of the stereoscopic display device 2, an image for the right eye and an image for the left eye, which are emitted by the U lines 110 and divided by a virtual lenticular screen formed by the first electrode lines 610a, are at different positions along the horizontal direction from an image for the right eye and an image for the left eye, which are emitted by the B lines 120 and divided by a virtual lenticular screen formed by the second electrode lines 610b.

More specifically, these images are staggered along the horizontal direction by only one half of an inter-view distance in a manner similar to Embodiment 1. In the present embodiment, too, either the U lines 110 or the B lines 120 are turned on in the tracking three-dimensional display mode according to the position of the viewer 90. This makes it possible to reduce crosstalk across a wide region.

The pixel arrangement of the display panel 50 of the stereoscopic display device 2 is a matrix pixel arrangement, which is commonly used. For this reason, the display panel 50 is superior in mass productivity in comparison to the display panel 10 of the stereoscopic display device 1.

<Embodiment 3>

Figure 23:
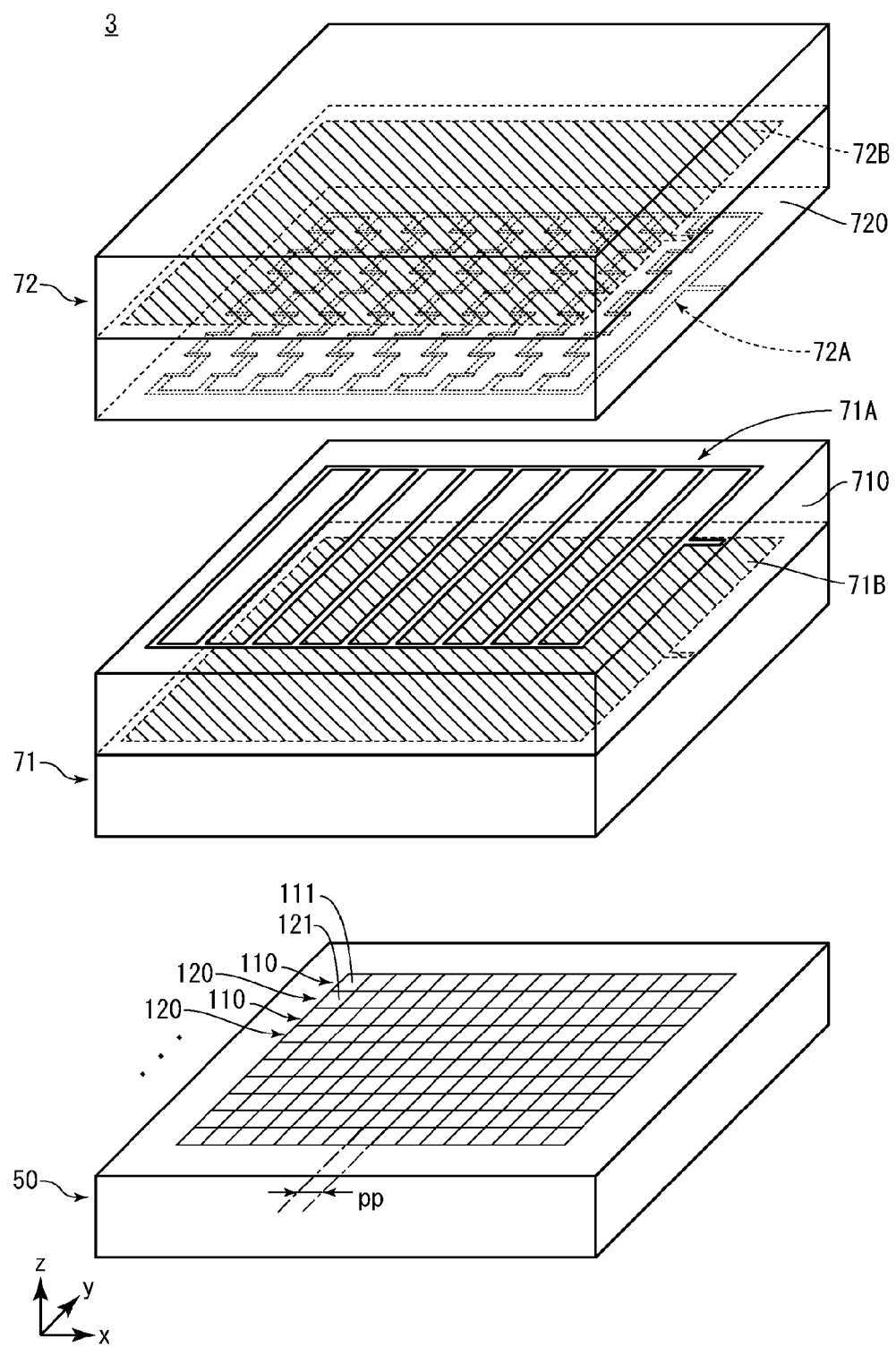
FIG. 23 shows schematic diagrams of configurations of a first substrate and a second substrate of a switching liquid crystal panel, and a pixel arrangement of a display panel according to Embodiment 3 of the present invention.

A stereoscopic display device 3 according to Embodiment 3 of the present invention has a switching liquid crystal panel with a different configuration from the switching liquid crystal panel of the stereoscopic display device 2. The switching liquid crystal panel of the stereoscopic display device 3 is equipped with a first substrate 71 in lieu of the first substrate 61, and a second substrate 72 in lieu of the second substrate 21. FIG. 23 shows schematic diagrams of configurations of the first substrate 71 and the second substrate 72 of the switching liquid crystal panel of the stereoscopic display device 3, and a pixel arrangement of a display panel 50. In FIG. 23, hatching is applied to common electrodes 71B and 72B. This is done for clarity of illustration, and is not intended to represent cross-sectional structures.

Formed on the first substrate 71 from the substrate side are: the electrode 71B (a first common electrode), an insulating film 710 (a first insulating film), and an electrode 71A (a first pattern electrode). The electrode 71B is formed in a planar shape. It is preferable that the electrode 71B be formed on substantially the entire surface of the first substrate 71. The insulating film 710 is formed so as to cover the electrode 71B, and insulates the electrode 71B and the electrode 71A. The configuration of the electrode 71A is substantially identical to the configuration of the pattern electrode 210.

Formed on the second substrate 72 from the substrate side are: the electrode 72B (a second common electrode), an insulating film 720 (a second insulating film), and an electrode 72A (a second pattern electrode). The electrode 72B is formed in a planar shape. It is preferable that the electrode 72B be formed on substantially the entire surface of the second substrate 72. The insulating film 720 is formed so as to cover the electrode 72B, and insulates the electrode 72B and the electrode 72A. The configuration of the electrode 72A is substantially identical to the configuration of the pattern electrode 610.

The electrodes 71A, 71B, 72A, and 72B are ITO, deposited by CVD or sputtering, and patterned by photolithography, for example. The insulating films 710 and 720 are SiO or SiN and are deposited by CVD, for example. The insulating films 710 and 720 may be transparent resins and may be deposited by a spin coater or a slit coater.

Note that the electrode 71A may be formed on the second substrate 72 and the electrode 72A may be formed on the first substrate 71.

FIG. 24 is a table summarizing the operations of the stereoscopic display device 3 in each display mode. In the present embodiment, unlike Embodiments 1 and 2, the control section 40 turns on both the U lines 110 and the B lines 120 in the three-dimensional display mode.

In the present embodiment, the control section 40 controls the operation of the switching liquid crystal panel by controlling the potentials of the electrodes 71A, 71B, 72A, and 72B. FIG. 25 is a table summarizing the potentials to be applied to respective electrodes when liquid crystal is driven by a square wave AC voltage (+/−) and a ground potential (GND). FIG. 26 is a table summarizing the potentials to be applied to respective electrodes when liquid crystal is driven by the potential differences between in-phase and antiphase square wave AC voltages.

In the two-dimensional display mode, the control section 40 equalizes the potentials of the electrodes 71A, 71B, 72A, and 72B. Specifically, the potentials of the electrodes 71A, 71B, 72A, and 72B may be ground potentials, as shown in FIG. 25. Alternatively, the electrodes 71A, 71B, 72A, and 72B may be driven by in-phase voltages, as shown in FIG. 26. As a result, the switching liquid crystal panel does not have a lens effect, and an image displayed on the display panel 50 is passed through the switching liquid crystal panel almost as is.

In the three-dimensional display mode, the control section 40 generates a potential difference between the electrode 71A and the electrodes 71B, 72A, and 72B. Specifically, the potentials of the electrodes 71B, 72A, and 72B may be ground potentials, and a square wave AC voltage may be applied to the electrode 71A, as shown in FIG. 25. Alternatively, the electrode 71A and the electrodes 71B, 72A, and 72B may be driven by antiphase voltages, as shown in FIG.

26. As a result, the switching liquid crystal panel produces a lens effect, and divides an image displayed on the display panel 50 into an image for the right eye and an image for the left eye along the horizontal direction.

In this case, unlike Embodiments 1 and 2, an image for the right eye and an image for the left eye emitted by U lines 110 and divided by the switching liquid crystal panel are aligned along the horizontal direction with an image for the right eye and an image for the left eye emitted by B lines 120 and divided by the switching liquid crystal panel. For this reason, the control section 40 can cause both the U lines 110 and the B lines 120 to display images. Specifically, the control section 40 causes both the U lines 110 and the B lines 120 to display pixel data constituting an image for the right eye and pixel data constituting an image for the left eye alternately along the horizontal direction.

As a result, in the three-dimensional display mode, it is possible to achieve a resolution equivalent to 50% of the resolution of the display panel 50 (50% along the horizontal direction; 100% along the vertical direction), and a luminance equivalent to 100% of the luminance of the display panel 50.

In the tracking three-dimensional display mode, the control section 40 generates a potential difference between the electrode 72A and the electrodes 71A, 71B, and 72B. Specifically, the potentials of the electrodes 71A, 71B, and 72B may be ground potentials, and a square wave AC voltage may be applied to the electrode 72A, as shown in FIG. 25. Alternatively, the electrode 72A and the electrodes 71A, 71B, and 72B may be driven by antiphase voltages, as shown in FIG. 26. As a result, the switching liquid crystal panel produces a lens effect, and divides an image displayed on the display panel 50 into an image for the right eye and an image for the left eye along the horizontal direction.

In this case, in a manner similar to Embodiments 1 and 2, an image for the right eye and an image for the left eye emitted by the U lines 110 and divided by the switching liquid crystal panel 20 are at different positions along the horizontal direction from an image for right and an image for the left eye emitted by the B lines 120 and divided by the switching liquid crystal panel 20. More specifically, these images are staggered along the horizontal direction by only one half of an inter-view distance. In the tracking three-dimensional display mode, either the U lines 110 or the B lines 120 are turned on, in accordance with the position of the viewer 90. This makes it possible to reduce crosstalk in a wide region.

FIG. 27 is a table summarizing the effects of each embodiment. According to Embodiment 3, it is possible to achieve the same effects as those achieved by Embodiments 1 and 2 in the two-dimensional display mode and the three-dimensional display mode. In addition to this, according to Embodiment 3, it is possible to further improve the resolution and the luminance in the three-dimensional display mode.

<Other Embodiments>

Embodiments of the present invention have been described above, but the present invention is not limited to the above embodiments. Various changes can be made within the scope of the present invention. Additionally, the embodiments can be implemented in appropriate combinations.

In the above embodiments, an example in which a liquid crystal display panel was used as a display panel was described. However, a plasma display panel or an organic EL (Electro Luminescence) panel may also be used instead of the liquid crystal display panel.

INDUSTRIAL APPLICABILITY

The present invention has industrial applicability as a stereoscopic display device.

What is claimed is:

1. A stereoscopic display device, comprising:
a display panel that displays image data;
a switching liquid crystal panel superimposed on said display panel to receive the image data displayed on said display panel and form a right-eye image and a left-eye image that are separated in a horizontal direction adjacent to an observer;
a control unit that controls said display panel and said switching liquid crystal panel; and
a position sensor that acquires positional information of the observer and supplies said positional information to said control unit,
wherein said display panel includes a first set of pixel rows and a second set of pixel rows arranged alternately in a vertical direction,
wherein said control unit switches among a plurality of display modes including a tracking three-dimensional display mode,
wherein, in said tracking three-dimensional display mode, said control unit causes the switching liquid crystal panel to separate the image data displayed on said display panel to form the right-eye image and the left-eye image that are separated in the horizontal direction adjacent to the observer,
wherein, in said tracking three-dimensional display mode, a position of said right-eye image originating from said first set of pixel rows and formed by said switching liquid crystal panel differs in the horizontal direction from a position of said right-eye image originating from said second set of pixel rows and formed by said switching liquid crystal panel,
wherein, in said tracking three-dimensional display mode, a position of said left-eye image originating from said first set of pixel rows and formed by said switching liquid crystal panel differs in the horizontal direction from a position of said left-eye image originating from said second set of pixel rows and formed by said switching liquid crystal panel, and
wherein, in said tracking three-dimensional display mode, the control unit selects either said first set of pixel rows or said second set of pixel rows for display in accordance with said positional information of the observer, and causes pixel data that forms said right-eye image and pixel data that forms said left-eye image to be alternately displayed in the horizontal direction in the selected first or second set of pixels rows so that the observer can continue to see a stereoscopic image even when the observer moves relative to the stereoscopic display device.

2. The stereoscopic display device according to claim 1, wherein each row of said first set of pixel rows and said second set of pixel rows includes a plurality of pixels arranged at a prescribed pixel pitch in the horizontal direction, and
wherein the pixels in the first set of pixel rows and the pixels in the second set of pixel rows are arranged so as to be offset by half of said pixel pitch in the horizontal direction.

3. The stereoscopic display device according to claim 2, wherein said switching liquid crystal panel comprises:
a first substrate;

a second substrate disposed to face said first substrate; and a liquid crystal layer sandwiched between said first substrate and said second substrate.

4. The stereoscopic display device according to claim 3, wherein, when there is no potential difference between said first substrate and said second substrate, an orientation direction of liquid crystal molecules of said liquid crystal layer on a side of said first substrate and an orientation direction thereof on a side of said second substrate are substantially parallel.

5. The stereoscopic display device according to claim 3, wherein, when there is no potential difference between said first substrate and said second substrate, an orientation direction of liquid crystal molecules of said liquid crystal layer on a side of said first substrate and an orientation direction thereof on a side of said second substrate are substantially orthogonal.

6. The stereoscopic display device according to claim 1, wherein said switching liquid crystal panel comprises:
a first substrate;
a second substrate disposed to face said first substrate; and
a liquid crystal layer sandwiched between said first substrate and said second substrate.

7. The stereoscopic display device according to claim 6, wherein, when there is no potential difference between said first substrate and said second substrate, an orientation direction of liquid crystal molecules of said liquid crystal layer on a side of said first substrate and an orientation direction thereof on a side of said second substrate are substantially parallel.

8. The stereoscopic display device according to claim 6, wherein, when there is no potential difference between said first substrate and said second substrate, an orientation direction of liquid crystal molecules of said liquid crystal layer on a side of said first substrate and an orientation direction thereof on a side of said second substrate are substantially orthogonal.

9. The stereoscopic display device according to claim 1, wherein said switching liquid crystal panel comprises:
a first substrate;
a second substrate disposed to face said first substrate;
a liquid crystal layer sandwiched between said first substrate and said second substrate;
a pattern electrode formed on said first substrate; and
a common electrode formed in a planar shape on said second substrate,
wherein said pattern electrode includes a first set of electrode rows superimposed on said first set of pixel rows in a plan view, and a second set of electrode rows superimposed on said second set of pixel rows in the plan view,
wherein each of said first set of electrode rows and said second set of electrode rows includes a plurality of electrodes arranged at a prescribed electrode pitch in the horizontal direction, and
wherein the electrodes of said first set of electrode rows and the electrodes of said second set of electrode rows are arranged so as to be offset by ¼ of said electrode pitch in the horizontal direction.

10. The stereoscopic display device according to claim 1, wherein said switching liquid crystal panel includes:
a first substrate;
a second substrate disposed to face said first substrate;
a liquid crystal layer sandwiched between said first substrate and said second substrate;
a first common electrode formed in a planar shape on said first substrate;
a first pattern electrode formed on said first substrate;
a first insulating film formed between said first common electrode and said first pattern electrode;
a second common electrode formed in a planar shape on said second substrate;
a second pattern electrode formed on said second substrate; and
a second insulating film formed between said second common electrode and said second pattern electrode,
wherein said first pattern electrode includes a plurality of electrodes arranged at a prescribed electrode pitch in the horizontal direction,
wherein said second pattern electrode includes a first set of electrode rows superimposed on said first set of pixel rows in a plan view and a second set of electrode rows that overlap said second set of pixel rows in the plan view,
wherein said first set of electrode rows and said second set of electrode rows include a plurality of electrodes arranged at said electrode pitch in the horizontal direction, and
wherein the electrodes of said first electrode rows and the electrodes of said second electrode rows are arranged so as to be offset by ¼ of said electrode pitch in the horizontal direction.

11. The stereoscopic display device according to claim 1 any, wherein said switching liquid crystal panel further comprises a polarizing plate disposed on a side of said observer.

12. The stereoscopic display device according to claim 1, wherein said display panel is a liquid crystal display panel.

* * * * *